(12) United States Patent
Goto et al.

(10) Patent No.: US 7,831,577 B2
(45) Date of Patent: Nov. 9, 2010

(54) SYSTEM, METHOD, AND PROGRAM FOR CONTENT SEARCH AND DISPLAY

(75) Inventors: Masataka Goto, Tsukuba (JP); Takayuki Goto, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 481 days.

(21) Appl. No.: 11/719,495

(22) PCT Filed: Nov. 21, 2005

(86) PCT No.: PCT/JP2005/021331
§ 371 (c)(1),
(2), (4) Date: Jul. 30, 2007

(87) PCT Pub. No.: WO2006/054739
PCT Pub. Date: May 26, 2006

(65) Prior Publication Data
US 2008/0065622 A1   Mar. 13, 2008

(30) Foreign Application Priority Data
Nov. 22, 2004   (JP) ............................ 2004-338235

(51) Int. Cl.
*G06F 17/30* (2006.01)
(52) U.S. Cl. .................. 707/705; 707/729; 715/745
(58) Field of Classification Search .................. None
See application file for complete search history.

(56) References Cited

U.S. PATENT DOCUMENTS

| | | | |
|---|---|---|---|
| 5,616,876 A * | 4/1997 | Cluts | 84/609 |
| 5,659,742 A * | 8/1997 | Beattie et al. | 707/104.1 |
| 5,969,283 A * | 10/1999 | Looney et al. | 84/609 |
| 6,201,176 B1 * | 3/2001 | Yourlo | 84/609 |
| 6,232,539 B1 * | 5/2001 | Looney et al. | 84/609 |
| 6,452,609 B1 * | 9/2002 | Katinsky et al. | 715/716 |
| 6,587,127 B1 * | 7/2003 | Leeke et al. | 715/765 |
| 6,674,452 B1 * | 1/2004 | Kraft et al. | 715/765 |

(Continued)

FOREIGN PATENT DOCUMENTS

JP   2001-282847   10/2001

(Continued)

OTHER PUBLICATIONS

"Music Similarity Measures: What's the Use?", Jean-Julien Aucouturier and Francois Pachet, Sony Computer Science Lab.

(Continued)

*Primary Examiner*—Neveen Abel Jalil
*Assistant Examiner*—Jacques Veillard
(74) *Attorney, Agent, or Firm*—Rankin, Hill & Clark LLP

(57) ABSTRACT

A content search and display system capable of increasing opportunities for a user to encounter more unknown contents than ever. Operating situation detecting device detects an operating situation of search condition specifying device. According to the operating situation of the search condition specifying device, condition adding/modifying device adds or modifies a search condition. In the course of searching, opportunities are produced for the user to encounter unexpected unknown contents not randomly, but based on a certain search condition, by operating the search condition specifying device.

19 Claims, 19 Drawing Sheets

U.S. PATENT DOCUMENTS

| | | | |
|---|---|---|---|
| 6,938,209 B2* | 8/2005 | Ogawa et al. | 715/727 |
| 7,047,502 B2* | 5/2006 | Petropoulos et al. | 715/781 |
| 7,565,622 B2* | 7/2009 | Chen et al. | 715/810 |
| 7,660,822 B1* | 2/2010 | Pfleger | 707/104.1 |
| 2002/0130898 A1* | 9/2002 | Ogawa et al. | 345/727 |
| 2004/0027931 A1* | 2/2004 | Morita | 369/30.09 |
| 2006/0069996 A1* | 3/2006 | Greaves | 715/708 |

FOREIGN PATENT DOCUMENTS

| | | |
|---|---|---|
| JP | 2002-041059 | 2/2002 |
| JP | 2004-070510 | 3/2004 |

OTHER PUBLICATIONS

"Musical Genre Classification of Audio Signals", George Tzanetakis and Perry Cook, IEEE Transactions on Speech and Audio Processing, vol. 10, No. 5, Jul. 2002, pp. 293-302.

* cited by examiner

SYSTEM, METHOD, AND PROGRAM FOR CONTENT SEARCH AND DISPLAY

FIELD OF THE INVENTION

The present invention relates to a system, a method, and a computer program for content search and display that are capable of producing opportunities to encounter unknown or unexpected contents.

RELATED ART

Existing music content playback interfaces satisfy user's desires like "I want to listen to this music," by searching the music based on the title of the music or the artist's name. However, they are inadequate to meet user's desires like "I want to hear something," "I wish to listen to some unknown song of my favorite genre," and "I want to listen to musical pieces in my way of arranging the listening order." These desires will become more and more common in the next-generation music-listening environment since people now can readily listen to their favorite music anytime, anywhere via a portable audio player capable of storing 10,000 musical pieces. Such a demand for content search and display (visual and audio reproduction) will also grow in various genres of music as well as books, movies, games, and photographs.

Non-Patent Document 1 ("Musical Genre Classification of Audio Signals" written by G. Tzanetakis and P. Cook, IEEE Trans. on Speech and Audio Proc., Vol. 10, No. 5, 2002) and Non-Patent Document 2 ("Music Similarity Measures: What's the Use?" written by J. Aucouturier and F. Pachet, Proc. of ISMIR 2002, pp. 157-163, 2002) have respectively proposed a technique to search many similar musical pieces so that the user can listen to the music of a similar mood.

Patent Document 1 (Japanese Patent Publication No. 2002-041059) has disclosed a music contents distribution device which is capable of producing opportunities to encounter unknown contents. This music contents distribution device uses acoustic parameters to suggest music contents which meet the user's taste.

DISCLOSURE OF THE INVENTION

Problem to be Solved by the Invention

Technologies shown in Non-Patent Documents 1 and 2 have a mere function of listing up musical pieces of a mood similar to a particular musical piece and have given no consideration to an operation like a listener's behavior of picking up one CD after another from a stack of CDs and listening to the CD each time.

According to technologies described in Patent Document 1, the same search parameter always leads to the same search result. Thus, the probability of coming across unknown contents is not always high.

Many existing audio players have been equipped with functions that enable the user to specify his or her own playlist, or a list indicating in what order musical pieces should be played back. These functions can merely sort musical pieces in the playlist, or add or delete a particular musical piece from the playlist, only to provide the user with a low degree of freedom.

In addition, it is necessary for the user to consciously save the playlist used at a particular time for later reference if he or she wishes to know the order of playing the musical pieces at that time.

An object of the present invention is to provide a system, a method, and a computer program for content search and display that provide the user with more opportunities to encounter unknown or unexpected contents than ever by adding or modifying search conditions depending upon an operating situation for the user.

Another object of the present invention is to provide a system, a method, and a computer program for content search and display that achieve a high degree of freedom in searching various contents such as music contents and editing searched contents.

A further object of the present invention is to provide a system, a method, and a computer program for content search and display that are capable of readily reproducing music contents that have been heard at a particular point of time in the past.

Means for Solving the Problem

A content search and display system of the present invention comprises content storing means in which many contents are stored, search condition specifying means to be operated by a user for specifying a search condition, content searching means, and search result displaying means. For example, the content storing means may be provided internally in a computer or externally from the computer. Also, it may be a database accessible via the Internet. Contents to be stored typically include musical pieces, books, movies, images, texts, academic papers, and other different contents.

Specifically, the search condition specifying means includes a mouse for a personal computer, or pen-type or keyboard input equipment, and a pointer to be displayed on the screen and driving means therefor. It is arbitrary how to specify a search condition via the search condition specifying means. For example, a search condition associated with a particular image may be determined by clicking the image displayed on the screen with a pointer moving on the screen.

The content searching means may be configured to search one or more contents, which meet at least part of the search condition, among the many contents, based on the search condition specified by the user. The search condition may be set as meeting all the specified search conditions. In order to increase opportunities to encounter unknown contents, it may preferably be specified that at least part of the specified search condition should be met. The search result displaying means displays a result of the search carried out by the content searching means. The search result may be represented with images or sounds or both of them, but not limited to the foregoing.

The content searching means includes operating situation detecting means, condition adding/modifying means, and search result accumulating means. The operating situation detecting means detects an operating situation of the search condition specifying means during searching. For example, when the search condition specifying means is something that displays a pointer on the display screen, the operating situation detecting means may accordingly detect, as an operating situation, a course along which the pointer moves and a positional relationship between the pointer and an image displayed on the display screen. The condition adding/modifying means adds and/or modifies the search condition in the course of searching in accordance with the operating situation detected by the operating situation detecting means. The addition of search conditions includes addition of another search condition to all of initially specified search conditions, or addition of another search condition to part of the initially specified search conditions. Modification of search conditions includes modification of all of initially specified search conditions with other conditions, or modification of part of the initially specified search conditions with other conditions. The search result accumulating means cumulatively stores a search result based on the search condition specified by the user and/or the search condition added and/or modified by the condition adding/modifying means. Regardless of the specified search conditions, the search result accumulating means cumulatively stores searched results during searching. Therefore, the search result accumulating means may cumulatively store search results associated with contents which meet different search conditions as the search conditions are modified. Data cumulatively stored in the search result accumulating means may be of any kind, provided that the data can finally represent the searched contents. The data may be a list of contents or contents themselves. The result thus searched will be reproduced by the search result displaying means.

In the present invention, the search conditions may be added or modified depending upon the operating situation of the search condition specifying means. Consequently, it is possible to produce opportunities to encounter unknown or unexpected contents, not at random, but in accordance with a certain search condition by operating the search condition specifying means in the course of searching. Thus, a novel system for content search and display may be obtained.

When the search result displaying means includes a display screen, the content searching means may include content mark displaying means. The content mark displaying means defines a plurality of mark display regions on the display screen. The content mark displaying means sequentially displays a plurality of content marks, which respectively correspond to the many contents stored in the content storing means, in the plurality of mark display regions in accordance with a predetermined criterion. A content mark refers to a mark which indicates which mark corresponds to which content. An arbitrary form of the mark may be employed. For example, a mark may consist of graphics only, or may be a combination of graphics, and literal and symbolic information. A "predetermined criterion" may be differently established. For example, a "predetermined criterion" may be defined for music contents as musical genres or dates that musical pieces were composed. Also, the number of contents mark may be defined per unit time for displaying the marks in the mark display region. The predetermined criterion may be separately defined for each of the mark display regions.

In this arrangement, the search condition specifying means to be operated by the user is configured to operate a pointer which makes the content searching means operable to search when the pointer is displayed on the display screen and is enabled. The operating situation detecting means is configured to detect the operating situation, based on a co-relation between the pointer moving on the display screen and the content marks displayed in the mark display regions. With this configuration, the search condition varies when the pointer is moved appropriately to go over content marks. Opportunities to encounter unknown contents may intentionally be increased according to the user's operation.

The content mark displaying means may be configured to display the content marks in the mark display regions in such a manner that the content marks are spaced to each other and moving from one side to the other side in a certain direction. When the content mark is thus moved, a co-relation of the marks with the pointer may have casualness or contingency, thereby increasing the probability of coming across unknown contents.

The condition adding/modifying means may be configured to add and/or modify the search condition so as to search the contents that correspond to the content marks displayed in the mark display region and are overlapped with the pointer, when the pointer is placed in one of the mark display regions and is enabled. In other words, when the pointer is enabled (generally, is clicked), a content corresponding to the first content mark, which the pointer goes over in the mark display region, will be searched. In this case, when the moving pointer gets in contact with a content mark, the content corresponding to that content mark will be searched since the outlines of the pointer and content mark overlap with each other. Thus, the user may intentionally determine content marks corresponding to unknown contents. As a result, the search condition determined by the searching system may be modified with the pointer operated by the user. Consequently, the user's intentions may be associated with the probability of coming across unknown contents, thereby further increasing the opportunities to encounter unknown contents.

Specifically, the search condition specifying means may be configured to determine the search condition specified by the user as searching other contents associated with one of the contents that corresponds to one content mark overlapped with the pointer when the pointer is placed on the one content mark of the content marks displayed in one of the mark display regions and is enabled by the user. In this case, when specification of the search condition is completed, the search result displaying means displays the content marks on the display screen in the following manner. The one content mark sticks to the pointer when specification of the search condition is completed; while the pointer with the one content mark sticking thereto is moving over the content marks displayed in the mark display regions as the search condition specifying means is operated, a co-relation between the content and other contents corresponding to the other content marks overlapped with the pointer or the one content mark is checked based on the search condition; when a content which meets at least part of the search condition is searched, the content mark corresponding to this content sticks to the one content mark sticking to the pointer; and when a content is subsequently searched one after another, a content mark corresponding to the subsequently searched content sticks to the content mark moving together with the pointer. With the functions of the search result displaying means as described above, the user can visually confirm the searching process and result at a glance. The user can determine whether the search should be continued or stopped by counting the number of gathered content marks to know the number of searched contents. Thus, the user can limit the number of contents to be searched.

The search result displaying means may preferably have a function of defining a search result display region on the display screen and a function of graphically displaying one or more of the content marks corresponding to one or more searched contents in the search result display region as the search result. With the functions of the search result displaying means as described above, the current searching operation and the search result of the previous search may be confirmed on the same display screen. In addition, the search result may readily be displayed on the display screen merely by moving the pointer, thereby considerably increasing the operability of the content search and display.

Preferably, the search result displaying means may further have a function of selectively implementing graphical display of the one or more content marks in the search result display region as the search result, or graphical display of a representative content mark representing the one or more content marks. With this function of the search result displaying means, a number of search results may be displayed in a limited space by using the representative content mark when the search results are not immediately used. As needed, one or more contents may be displayed based on the representative content mark.

Preferably, the search result displaying means may further have a function of selectively displaying an enlarged image of the one or more content marks displayed in the search result display region. With this function of the search result displaying means, the search result displayed in a minimized form may securely be confirmed with an enlarged image as needed.

Preferably, the content search and display system may further comprise search result editing means for editing the search result by deleting one or more content marks from the search result displayed in the search result display region, sorting a plurality of content marks included in the search result, or adding one or more other content marks to the search result. With this function of the search editing means, the search result may be edited and displayed according to the user's intention, thereby allowing the user's taste to be reflected in a combination of unknown contents.

The search result editing means may preferably have a function of determining a degree of similarity between one content corresponding to one content mark selected from the content marks included in the search result and other contents corresponding to content marks other than the one content mark selected, making duplications of the content marks which are arranged in such a manner that the one content mark is placed at the top and is followed by the other content marks arranged in a descending order of the degree of similarity, and displaying the duplications distinguishably from the search result. With this function as described above, the user may efficiently confirm the contents similar to a content which is associated with a selected one content mark, with an aid of the duplications of content marks which have been sorted. As a result, the time required for editing may be reduced.

As described so far, an arbitrary kind of contents may be searched in the present invention. When many contents are music contents, the following configuration may be preferred. The search result displaying means may further include music playback and displaying means for playing back the music contents. The search result displaying means may be configured to cause the music playback and displaying means to play back the music content corresponding to the content mark selected once the one content mark is clicked with the pointer for selection from the one or more content marks displayed in the search result display region. With this configuration, the search result of the music contents displayed on the display screen may be reproduced merely by clicking the content marks, thereby significantly simplifying the playback operation of the music.

The content mark displaying means may preferably have a function of changing a representation of the content mark so that a playback state and/or playback position may be visually confirmed while the music playback and displaying means is playing back the music content corresponding to the content mark. With this function, the user may determine without question whether the playback should be continued or stopped in the course of the playback of the music. In this case, the content mark preferably include a playback position change command handle for generating a command to forcibly change a playback position of a music content when the handle is operated with the pointer during playback of the music content. Trial listening of unknown music contents may be summarized in a short time by manipulating the playback position change command handle. Thus, the time required for editing may be reduced.

More preferably, the search result displaying means may further have a function of displaying and moving a linear playback pointer in the search result display region, and a function of causing the music playback and displaying means to sequentially play back the music contents corresponding to the content marks as the playback pointer goes over the content marks in a given state as a result of moving the playback pointer when the content marks are lined up in the search result display region. With this function of the search result displaying means, the search result may be disposed in the search result display region as a collection of content marks, and the search result may sequentially be played back by intentionally or unintentionally moving the linear playback pointer in the search result region. Thus, an effect of continuous playback as with a multi-CD changer may be obtained. In addition to this function, the search result displaying means may have a function of restraining playback of the music contents corresponding to the one or more content marks represented by the one representative content mark although the playback pointer goes over the one representative content mark as a result of moving the playback pointer. With this function added, it will become possible to selectively stop the playback of some of the search result displayed on the display screen, and the user can listen only to the music according to the user's mood at a particular time. Thus, user-friendliness may be increased.

The content search and display system may further comprise similar music selecting and playback means for selecting a music content similar to the music content played back among the contents when playback of the music content is completed. With the similar music selecting and playback means, it will become possible for the user to encounter unknown contents of his or her taste without operating the system. Especially, when the similar music selecting and playback means has a function of selecting a music content similar to the music content played back among the contents corresponding to the content marks displayed in the mark display region when playback of the music content is completed, it will also become possible to focus on unknown contents of a particular music genre such as jazz and classic, by limiting the content marks displayed in the mar display region.

The similar music selecting and playback means may be configured to calculate a degree of similarity with reference to a feature vector of the music content, and to select a similar music content based on the calculated degree of similarity. With this configuration, it is relatively easy to search similar contents.

The content search and display system may further comprise past data recording means for storing all of data usable for reproducing a past operating situation shown on the display screen; and past data reproducing means for reproducing the past operating situation in an active state on the display screen, based on the data stored in the past data recording means. With these means, it will be possible to access the past search results at all times. When the user is busy or wishes to reproduce the past search result for playback, the user can use these means to play back the past search result.

The past data reproducing means may preferably include a slider for specifying a past point of time in a relative manner, and/or a slider for specifying a past date and time. Both of the sliders are displayed on the display screen and operated with the pointer. Only with a pointer operation, the past search results may roughly or accurately be accessed.

When music contents are to be searched, the present invention may provide a content search and display system capable of an operation which satisfies the user's desire to sequentially listen to musical pieces of a mood similar to one CD which has been casually picked up by the user from a stack of CDs, played and liked by the user. The content search and display system of the present invention may also satisfy the user's desire to consider the playback order of music pieces with a high degree of freedom equivalent to the one which allows the user to stack up CDs and sort the stacking order of the CDs on his or her own desk when he or she wants to listen to the music. In addition, the content search and display system of the present invention may also satisfy the user's desire to reproduce the playlist which was used at a particular point of time in the past, for example, on a memorial or memorable date.

A content search and display method of the present invention comprises a content storing means providing step of building up content storing means in which many contents are stored; a search condition specifying step of specifying a search condition using search condition specifying means to be operated by a user; a content searching step of searching one or more contents, which meet at least part of the search condition, among the many contents, based on the search condition specified by the user; and a search result displaying step of displaying a result of the search carried out in the content searching step. The content searching step includes an operating situation detecting step of detecting an operating situation of the search condition specifying means during searching; a condition adding/modifying step of adding and/or modifying the search condition in the course of searching in accordance with the operating situation detected in the operating situation detecting step; and a search result accumulating step of cumulatively storing a search result based on the search condition specified by the user and/or the search condition added and/or modified in the condition adding/modifying step.

A content search and display program of the present invention causes a computer to search and display a content from content storing means where many contents are stored. The program of the present invention is configured to cause the computer to perform: a search condition specifying function of specifying a search condition using search condition specifying means to be operated by a user; a content searching function of searching one or more contents, which meet at least part of the search condition, among the many contents, based on the search condition specified by the user; and a search result displaying function of displaying a result of the search obtained by performing the content searching function. Further, the content searching function includes: an operating situation detecting function of detecting an operating situation of the search condition specifying means during searching; a condition adding/modifying function of adding and/or modifying the search condition in the course of searching in accordance with the operating situation detected by performing the operating situation detecting function; and a search result accumulating function of cumulatively storing a search result based on the search condition specified by the user and/or the search condition added and/or modified by performing the condition adding/modifying function.

EFFECT OF THE INVENTION

In the present invention, the search condition is added and/modified according to the operating situation of the search condition specifying means to be operated by the user. Therefore, in the course of searching, the user may obtain opportunities to encounter unknown or unexpected contents that meet a certain search condition, by operating the search condition specifying means.

DESCRIPTION OF REFERENCE NUMERALS

Figure 1:
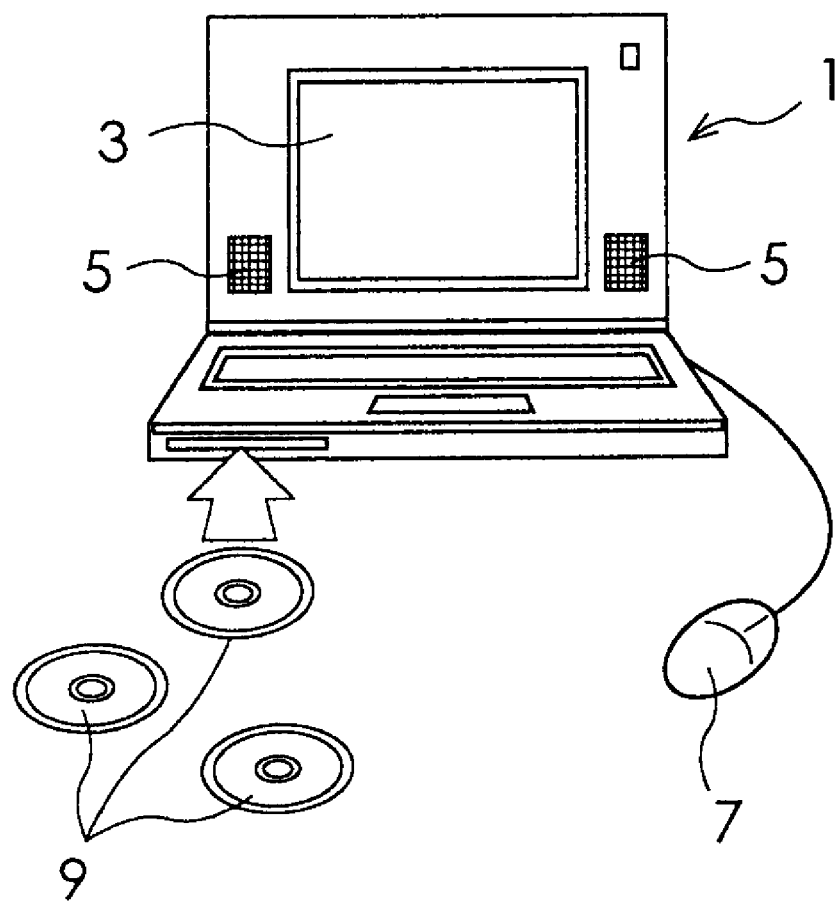
FIG. 1 illustrates a hardware configuration which implements a content search and display system of the present invention, using an ordinary personal computer 1.

1 Personal computer
3 Display
5 Speaker
7 Mouse (input means)
9 Compact disc
11 Content search and display system
13 Content storing means
15 Search condition specifying means
17 Content searching means
19 Search result displaying means
21 Display screen
23 Screen driving means
24 Music playback and displaying means
25 Operating situation detecting means
27 Condition adding/modifying means
29 Search result accumulating means
31 Content search implementing means
32 Content mark displaying means
33 Search result editing means
35 Past data recording means 37 Past date reproducing means
39 Similar music selecting and playback means

BEST MODE FOR IMPLEMENTING THE INVENTION

An embodiment of the present invention will now be described in detail with reference to accompanying drawings. FIG. 1 illustrates a hardware configuration which implements a content search and display system of the present invention, using an ordinary personal computer 1. A display 3 of the personal computer 1 is a display screen 21 of search result displaying means 19 which will be described later. A speaker 5 of the personal computer 1 is an acoustic representation portion of music playback and displaying means 24 of the search result displaying means. A mouse 7 is input means of search condition specifying means 15 which will be described later. In this embodiment, a computer program for content search and display according to this embodiment and many contents are stored in a compact disc 9. The computer program and the contents are installed in the personal computer 1. The computer program and contents may be installed in the personal computer via the Internet. Also, the contents may sequentially be retrieved from a database connected to the Internet.

Figure 2:
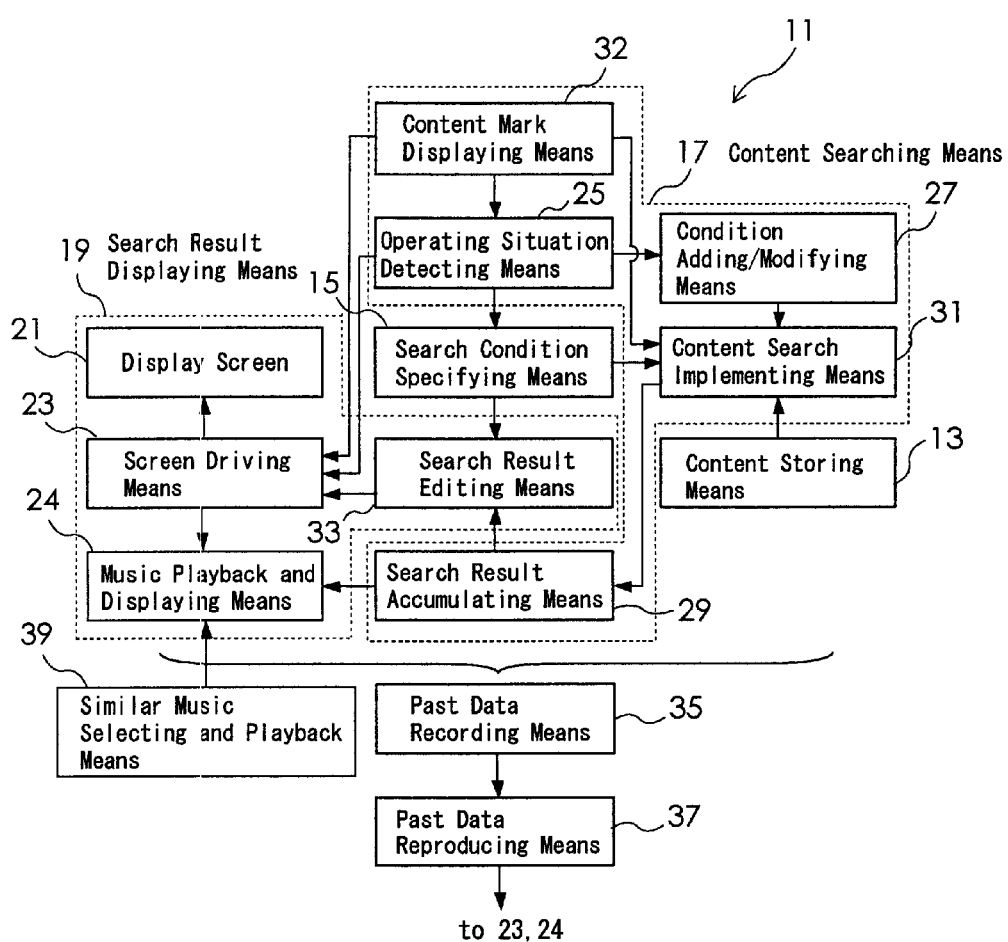
FIG. 2 is a conceptual block diagram showing respective means for implementing respective functions, which are configured with the hardware of the personal computer when the content search and display system of the present invention is implemented by a computer program installed therein.
Figure 3:
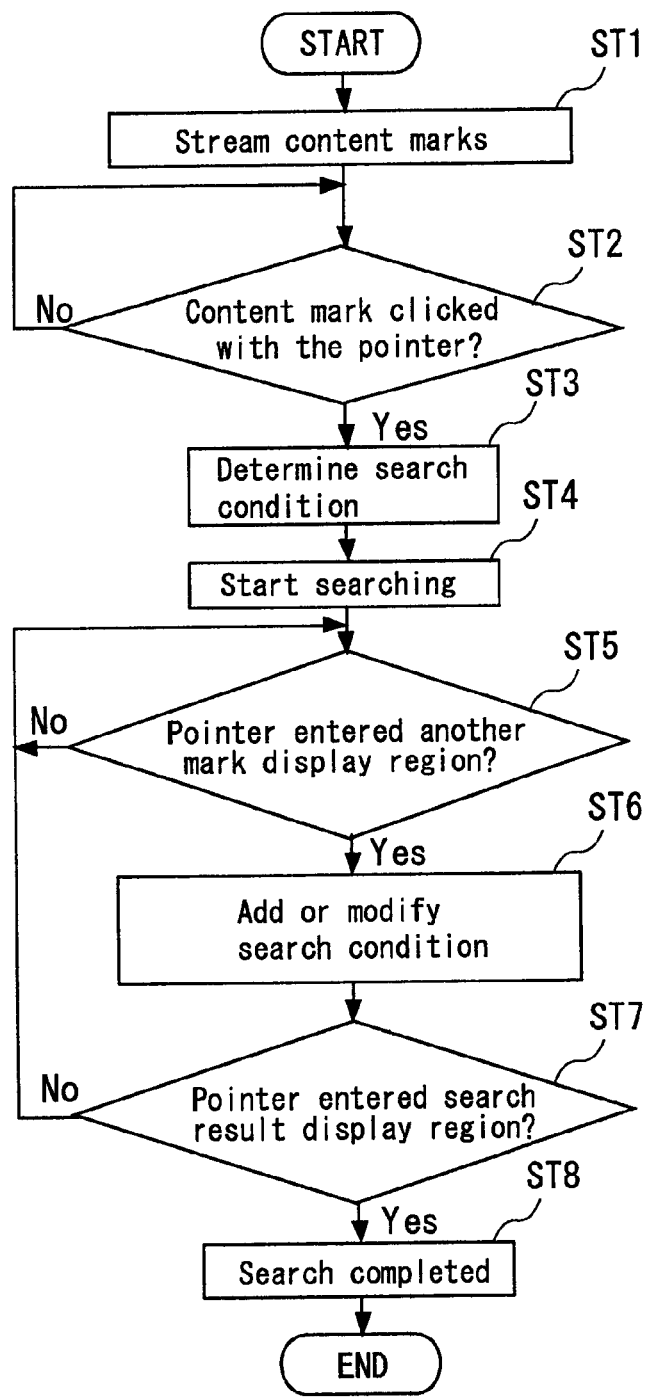
FIG. 3 is a flowchart showing the algorithm of one embodiment of a computer program according to the present invention.

FIG. 2 is a conceptual block diagram showing respective means for implementing respective functions, which are configured together with the hardware of the personal computer 1 when the content search and display system 11 of the present invention is implemented by a computer program installed therein. FIG. 3 is a flowchart showing the algorithm of one embodiment of a computer program according to the present invention. In the following descriptions, the respective means constituting the content search and display system 11 performs steps of a content search and display method and functions of a content search and display program of this embodiment. The content search and display system 11 of this embodiment comprises at least content storing means 13 in which many contents are stored, search condition specifying means 15 to be operated by a user, content searching means 17, and search result displaying means 19.

The search result displaying means 19 includes a display screen 21, a screen driving means 23, and a music playback and displaying means 24. The content searching means 17 includes at least operating situation detecting means 25, condition adding/modifying means 27, search result accumulating means 29, content search implementing means 31, and content mark displaying means 32.

The content storing means 13 is built up inside the personal computer 1 to be used by the user. As described before, the content storing means 13 may be located externally from the personal computer, or may be a database accessible via the Internet. Contents to be searched typically include music pieces, books, movies, images, and other different contents. Especially, in this embodiment, music contents are searched, displayed, and played back by way of illustration.

Specifically, the search condition specifying means 15 includes a mouse of a personal computer, or pen-type or keyboard input equipment, and a pointer displayed on the screen (see FIG. 4) and driving means for the pointer P. In this embodiment, a mouse 7 is used as the input means. It is arbitrary how to specify a search condition using the search condition specifying means 15. In this embodiment, a search condition associated with a particular image is specified by clicking that particular image with the pointer P moving on the display screen 21. To do this, a search condition specifying step of the content search and display method of this embodiment is executed, and a search condition specifying function of this embodiment is performed. A condition attributed to a content represented by a content mark is specified by clicking the content mark (image) corresponding to the content, which will be described later. A search condition is typically specified as pops, pleasant, up-tempo, instrumental, or gender of the artist.

The content searching means 17 searches one or more contents, which meet at least part of the search condition, among the many contents, based on the search condition specified by the user. To do this, a content searching step is executed, and a content searching function is performed. The search condition may be set as meeting all the specified search conditions. In order to increase opportunities to encounter unknown contents, it is specified that at least part of the specified search condition should be met. The search result displaying means 19 displays a result of the search carried out by the content searching means 17 on the display screen 21. The search result may be represented with images or sounds or both of them, but not limited to the foregoing. In this embodiment, the search result is displayed on the display screen 21, and is played back by the music playback and displaying means 24.

The content searching means 17 includes operating situation detecting means 25. The operating situation detecting means 2 detects an operating situation of the search condition specifying means 15 during searching. In this embodiment, an operating situation of the pointer P moving on the display screen 21 is detected as the mouse 7 is operated (see FIG. 1). To do this, an operating situation detecting step is executed, and an operating situation detecting function is performed. In this embodiment, the operating situation detecting means 25 detects, as an operating situation, a course along which the pointer moves and a positional relationship between the pointer P and an image displayed on the display screen 21.

The condition adding/modifying means 27 adds and/or modifies the search condition in the course of searching in accordance with the operating situation detected by the operating situation detecting means 25. To do this, a condition adding/modifying step is executed, and a condition adding/modifying function is performed. The addition of search conditions includes addition of another search condition to all of initially specified search conditions, or addition of another search condition to part of the initially specified search conditions. Modification of search conditions includes modification of all of initially specified search conditions with other conditions, or modification of part of the initially specified search conditions with other conditions. The content search implementing means 31 implements the search in a predetermined manner in accordance with the search condition. The manner in which the search is carried out in this embodiment will specifically be described later.

The search result accumulating means 29 cumulatively stores a search result based on the search condition specified by the user and/or the search condition added and/or modified by the condition adding/modifying means 27. To do this, a search result accumulating step is executed, and a search result accumulating function is performed. Regardless of the specified search conditions, the search result accumulating means 29 cumulatively stores searched results during searching. Therefore, the search result accumulating means 29 may cumulatively store search results associated with contents which meet different search conditions as the search conditions are modified. Data cumulatively stored in the search result accumulating means 29 may be of any kind, provided that the data can finally represent the searched contents. The data may be a list of contents or contents themselves. When data are stored in a list form, contents corresponding to the list are read out from the content storing means 13, and are played back. The result thus searched is reproduced by the search result displaying means 19. In this embodiment, the stored data are acoustic contents. The search result which is equivalent to the list is displayed on the display screen 21, the acoustic contents are played back by the music playback and displaying means 24. How the search result is displayed and how the acoustic contents are played back will later be described in detail.

Figure 4:
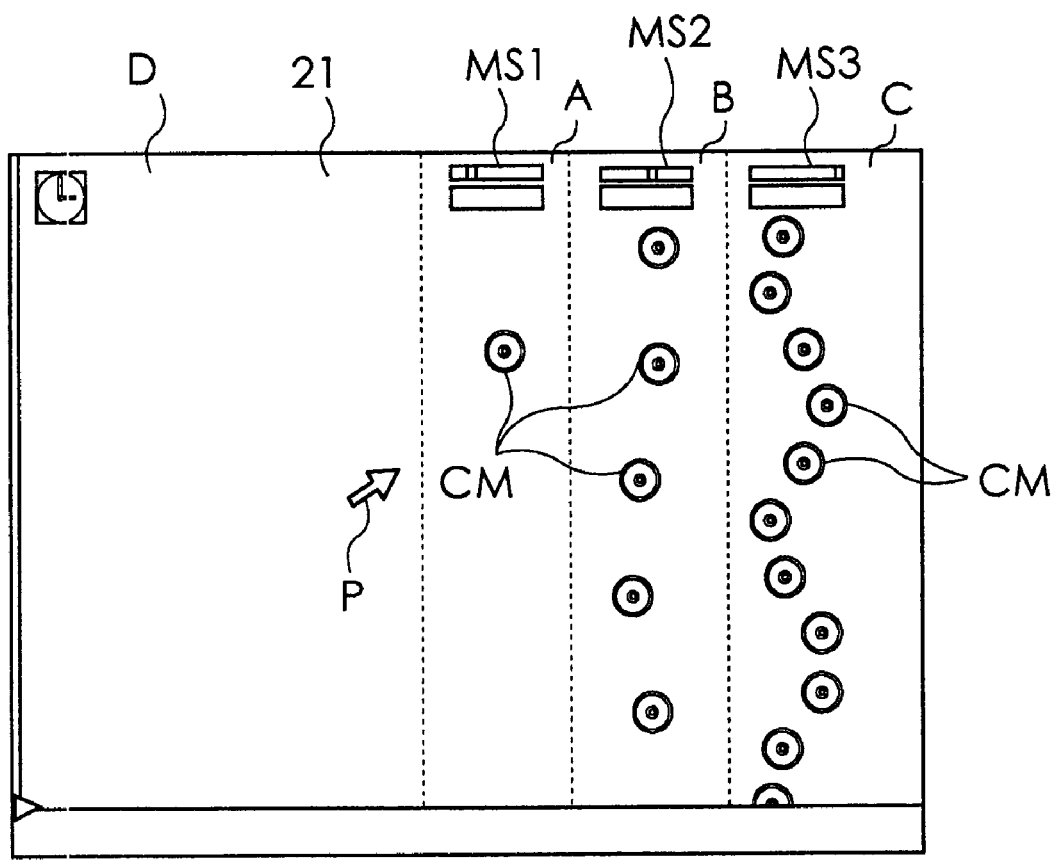
FIG. 4 illustrates one example of a display screen when music contents are searched.
Figure 5:
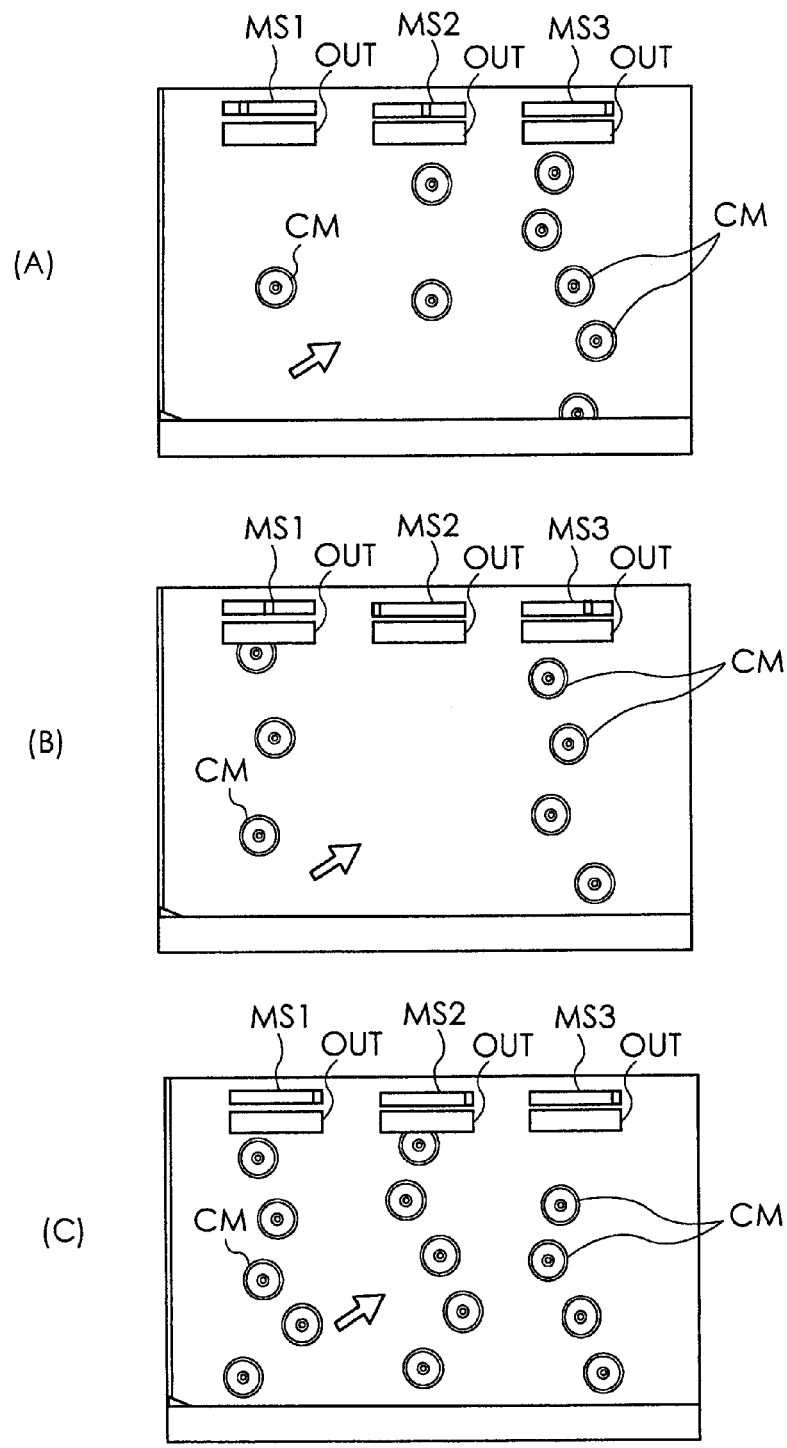
FIGS. 5A, 5B and 5C respectively illustrate how content marks are displayed in three mark display regions A, B and C when an adjustment amount of an adjustment slider is varied.
Figure 6:
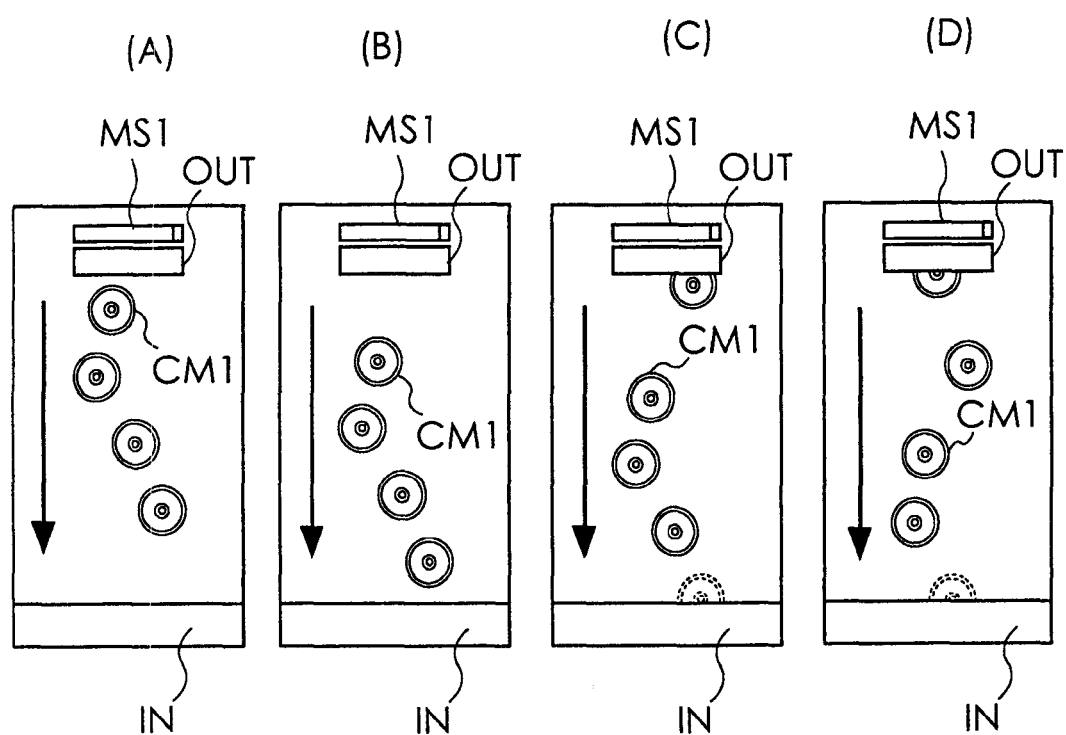
FIGS. 6A, 6B, 6C, and 6D sequentially illustrate what is displayed in one mark display region is changed as the time elapses.

The content mark displaying means 32 defines a plurality of mark display regions on the display screen 21. FIG. 4 illustrates one example of the display screen 21 when music contents are searched. As shown in FIG. 4, the content mark displaying means 32 sequentially displays a plurality of content marks CM, which respectively correspond to the many contents stored in the content storing means 13, in three mark display regions A, B, and C in accordance with a predetermined criterion. To do this, a content mark displaying step is executed, and a content mark displaying function is performed. Here, a content mark CM refers to a mark that indicates which mark corresponds to which content. In this embodiment, a content mark CM is constituted from a graphic imitating a compact disc recorded with a music piece, and letters indicated in the graphic. Since an illustration is very small, letters are omitted from the illustration. In the three mark display regions A to C, adjustment sliders MS1 to MS3 are respectively displayed as criterion setting means for determining the criterion for content marks CM to be displayed in the respective mark display regions. In this embodiment, the respective adjustment sliders MS1 to MS3 are operated with the pointer P to adjust the predetermined criterion, namely, the amount of content marks CM to be displayed or outputted in the respective mark display regions A to C. The adjustment slider MS1 shown in FIG. 4 indicates that the amount of content marks to be outputted is minimized or reduced. The slider MS2 indicates that the amount of content marks to be outputted is moderate. The slider MS3 indicates that the amount of content marks to be outputted is maximized. Depending upon the adjusted amount of content marks to be outputted, the amount of content marks CM displayed or outputted in the three mark display regions A to C is limited or adjusted as shown in FIG. 4. The adjustment sliders respectively work as a valve for a water tap. In this embodiment, the adjustment sliders SM1 to SM3 determine the number of content marks to be displayed per unit time in the mark display regions A to C. A region D of the display screen 21 is a search result display region which will be described later. FIGS. 5A, 5B and 5C respectively illustrate how content marks CM are displayed in three mark display regions A, B and C when the amount adjusted by the sliders is varied.

FIGS. 6A, 6B, 6C, and 6D sequentially illustrate what is displayed in one mark display region is changed as the time elapses. As shown in these figures, one content mark CM1 is moving as if it is outputted from an outlet OUT, shown below the adjustment slider SM1, and is flowing downward as the time elapses. When it gets into an inlet IN provided at the bottom, it disappears from the display screen 21. For example, supposing that music contents of 3000 pieces are provided for the mark display region A, 3000 content marks CM are sequentially flowing from the outlet OUT to the inlet IN in a repeated manner.

The operating situation detecting means 25 is configured to detect the operating situation, based on a co-relation between the pointer P moving on the display screen 21 and the content marks CM displayed in the three mark display regions A to C.

In this embodiment, the content mark displaying means 32 is configured to display the content marks CM in the three mark display regions A to C in such a manner that the content marks are spaced to each other and moving from one side to the other side in a certain direction. As with this embodiment, when the pointer P is moved to get in contact with the content marks CM, a co-relation of the marks with the pointer may have casualness or contingency.

Figure 7:
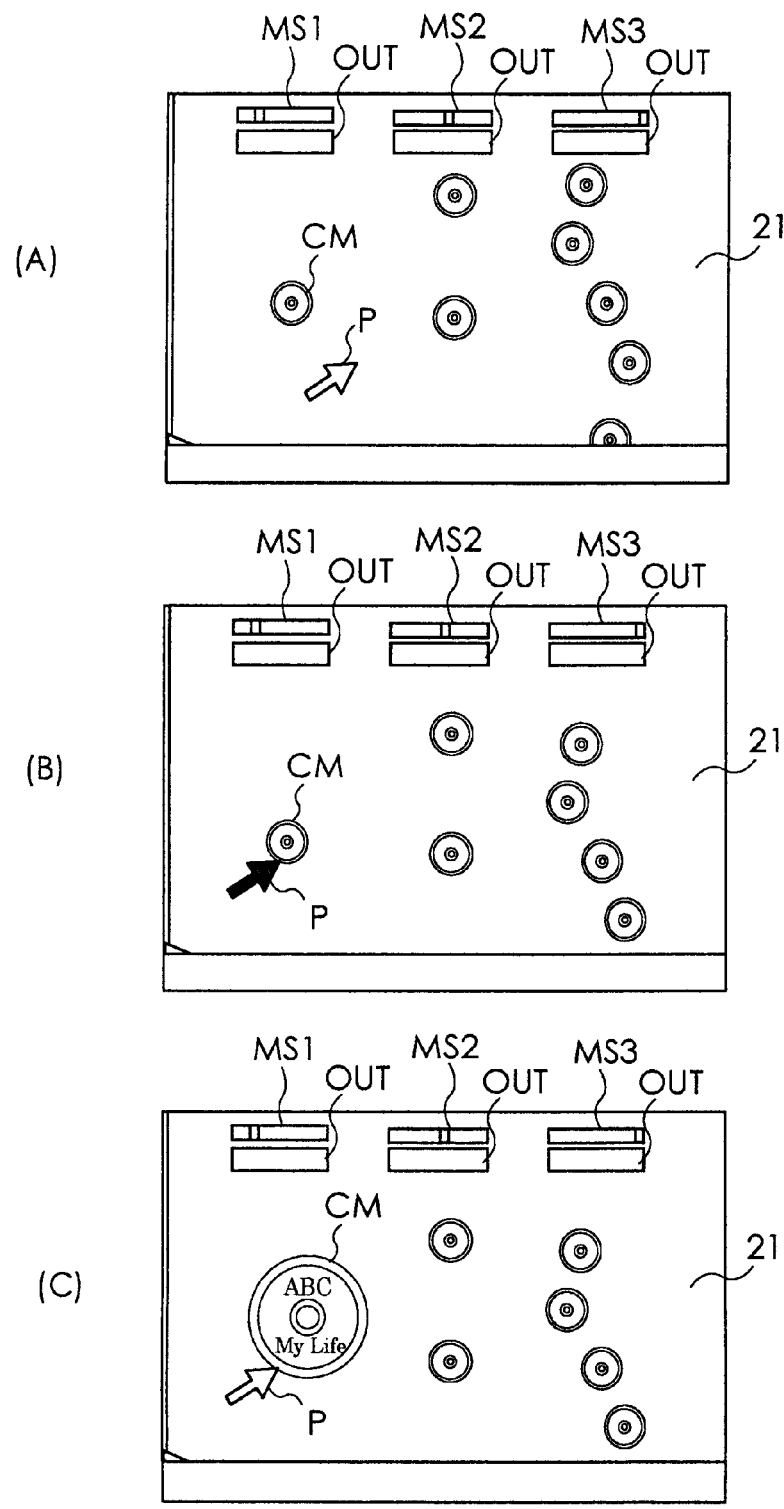
FIGS. 7A, 7B, and 7C illustrate how a pointer functions in the mark display region.

As shown in FIG. 7B, for example, when the pointer P is enabled (or clicked) and is moved to overlap with one content mark CM in the mark display region A, a content corresponding to the first content mark overlapped with the pointer P is checked in searching. In other words, based on the search condition associated with the content mark CM first clicked, a content which meets all or part of the search condition will be searched. In this embodiment, as shown in FIG. 7C, if a content mark gets in contact with the pointer P before the pointer P is enabled, the content mark CM is enlarged. When the content mark CM is enlarged, the artist's name, "ABC" in this embodiment and the title of the music, "My Life" in this embodiment, which are indicated on the surface of the content mark CM, may visually be confirmed. Therefore, the content corresponding to the content mark CM may be checked before selecting the content mark. The condition adding/modifying means 27 adds and/or modifies the search condition so as to search the contents that correspond to the content marks CM displayed in the mark display region and are overlapped with the pointer P, when the pointer P is placed in one of the mark display regions and is enabled.

Figure 8:
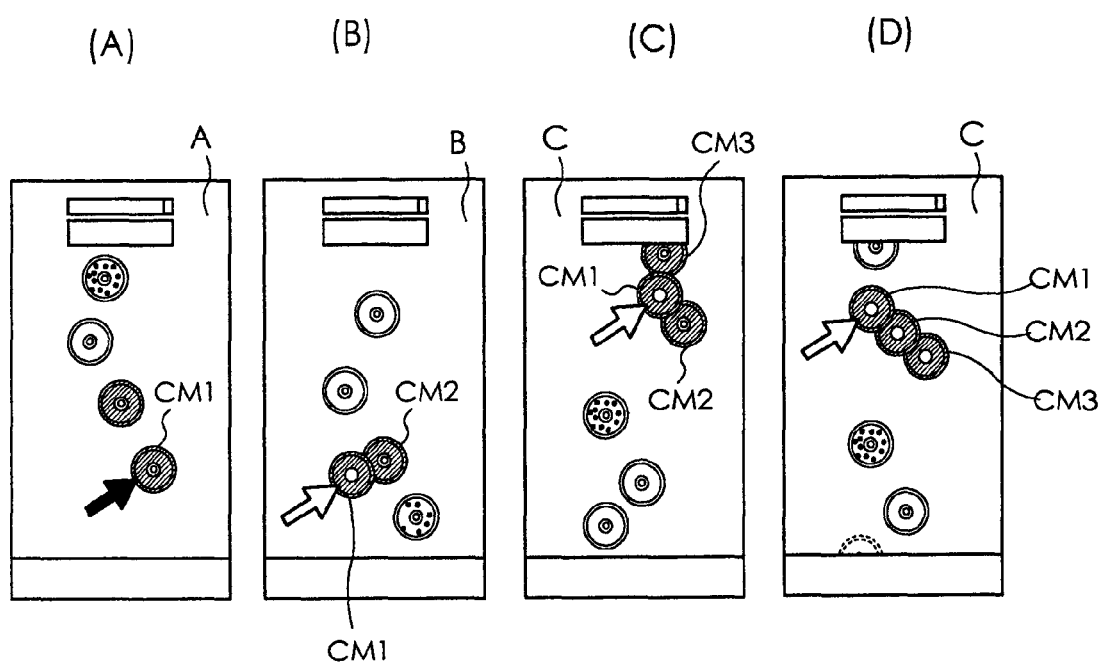
FIGS. 8A, 8B, 8C, and 8D illustrate a search operation.

Referring to FIGS. 8A to 8D, an example of the searching operation will be described below, and searching methods and searching functions that are associated with the searching operation will also be referred to. First, when the pointer P is placed on one content mark CM1 in one mark display region A and is enabled, it is determined that other contents associated with one of the contents that corresponds to this content mark CM1 overlapped with the pointer P is to be searched. At this point, the content mark CM1 sticks to the pointer P. Next, as shown in FIG. 8B, the pointer P is moved to a neighboring mark display region B. The movement of the pointer P is detected by the operating situation detecting means 25. Then, the condition adding/modifying means 27 adds and/or modifies the search condition. For example, a search condition is added so as to search only the contents corresponding to content marks CM flowing in the mark display region B. If the mark display region B is limited to a particular music genre, the genre defined in the search condition is modified. In the mark display region B, when an unknown content CM2 which meets all or part of the search condition gets overlapped with the pointer P or the content mark CM1 sticking to the pointer P, the content mark CM2 sticks to the content mark CM1 sticking to the pointer P. Further, as shown in FIG. 8C, when the pointer P is moved to the mark display region C, the movement of the pointer P is detected by the operating situation detecting means 25. Then, the condition adding/modifying means 27 adds and/or modifies the search condition. In other words, the search condition is modified so as to search only the contents corresponding to content marks CM flowing in the mark display region C. In the mark display region C, when an unknown content CM3 which meets all or part of the search condition gets overlapped with the pointer P or the content marks CM1, CM2 sticking to the pointer P, the content mark CM3 sticks to the content marks CM1, CM2 sticking to the pointer P. As shown in FIG. 8D, the content marks CM sticking to the pointer or other content marks are automatically arranged in the order that the content marks have stuck to the pointer or other content marks. The search condition is determined by the content search implementing means 31. A search result is cumulatively stored in the search result accumulating means 29. Content marks may be sorted by the search result editing means 33. Display operations on the display screen 21 are carried out by the search result displaying means 19.

Figure 9:
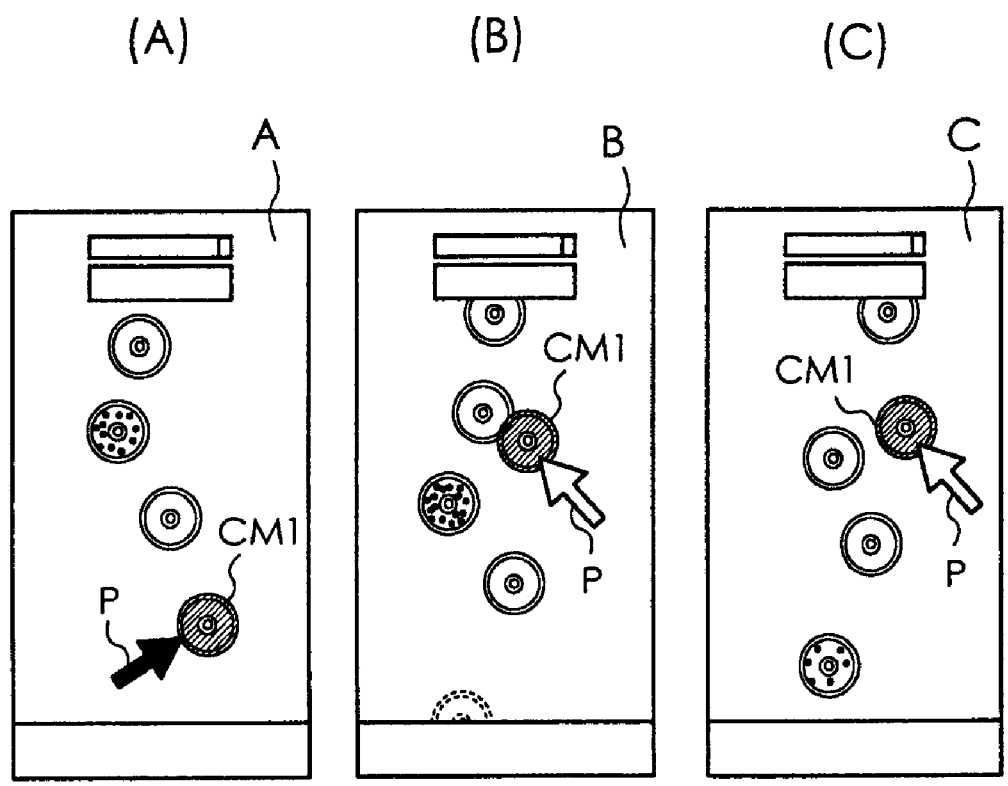
FIGS. 9A, 9B, and 9C illustrate a searching process when a search condition is not met.

FIGS. 9A to 9C illustrate a searching process when a search condition is not met. As shown in FIG. 9A, although the content mark CM1 selected in the mark display region A and is moved to the mark display region B together with the pointer P, if none of the contents corresponding to content marks CM flowing in the mark display regions B and C meets the search condition, no other content marks will stick to the content mark CM1 selected in the mark display region A. In this case, an additional function may be added to the condition adding/modifying means 27. For example, a certain content mark CM may forcibly be added to the content mark sticking to the pointer P when the pointer P is made to get in contact with the certain content mark CM n times by wiggling the pointer so as to get in contact with the certain content mark CM n times with the pointer P being placed overlapping with the certain content mark CM. Alternatively, a search condition associated with the content corresponding to that certain content mark may be added, or the search condition may be modified by restricting the condition to a common part of the current and previous search conditions. A function of adding and/or modifying the search condition is arbitrary, and is not limited to the foregoing. With such a function, when content searching is not satisfactory, the content search condition may be added and/or modified by changing the operating situation of the pointer P, for example, changing how to move the pointer, while visually checking with the display screen.

In this embodiment, the user can visually confirm the searching process and result at a glance. The user may determine whether the search should be continued or stopped by counting the number of gathered content marks to know the number of searched contents. Thus, the user may limit the number of contents to be searched. In addition, the user may intentionally determine which contents should be searched among unknown contents depending upon how to move the pointer P. As a result, the user may modify the search condition, which would generally be determined only by a search system, by operating the pointer P. Thus, the user's intention may be involved in encounters with unknown contents, thereby increasing the opportunities to come across unknown contents.

Figure 10:
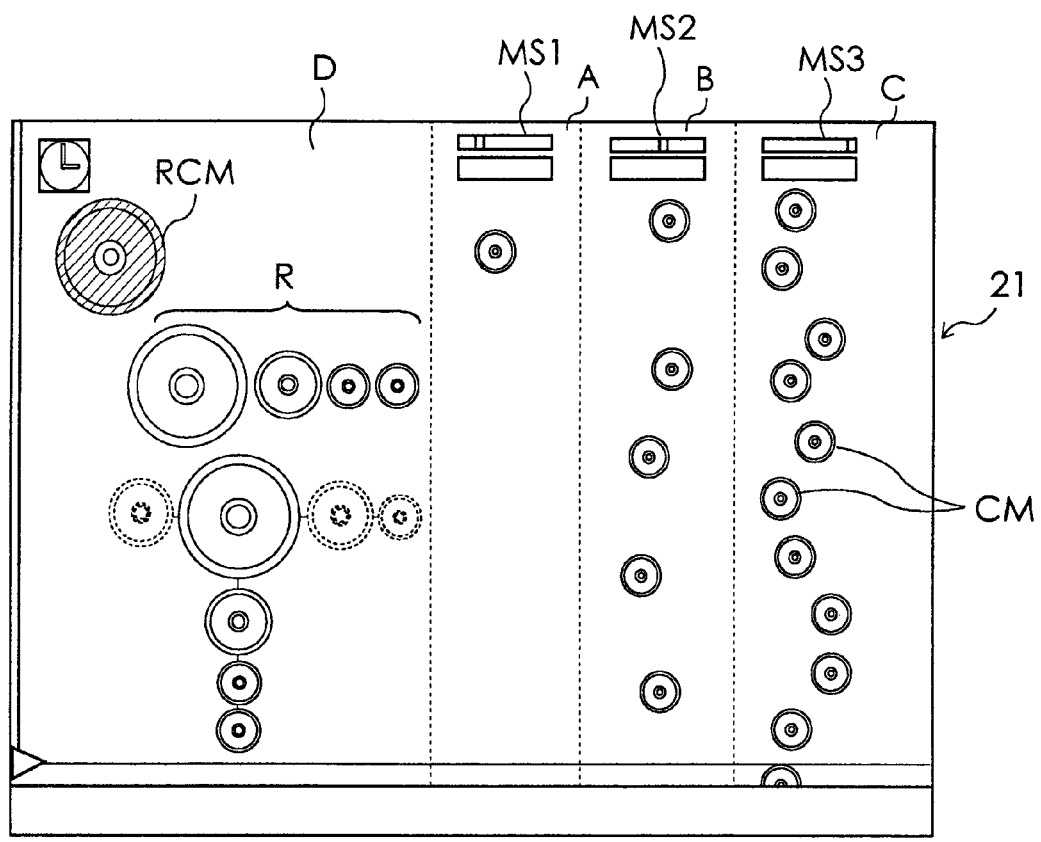
FIG. 10 illustrates an example of an interface.
Figure 11:
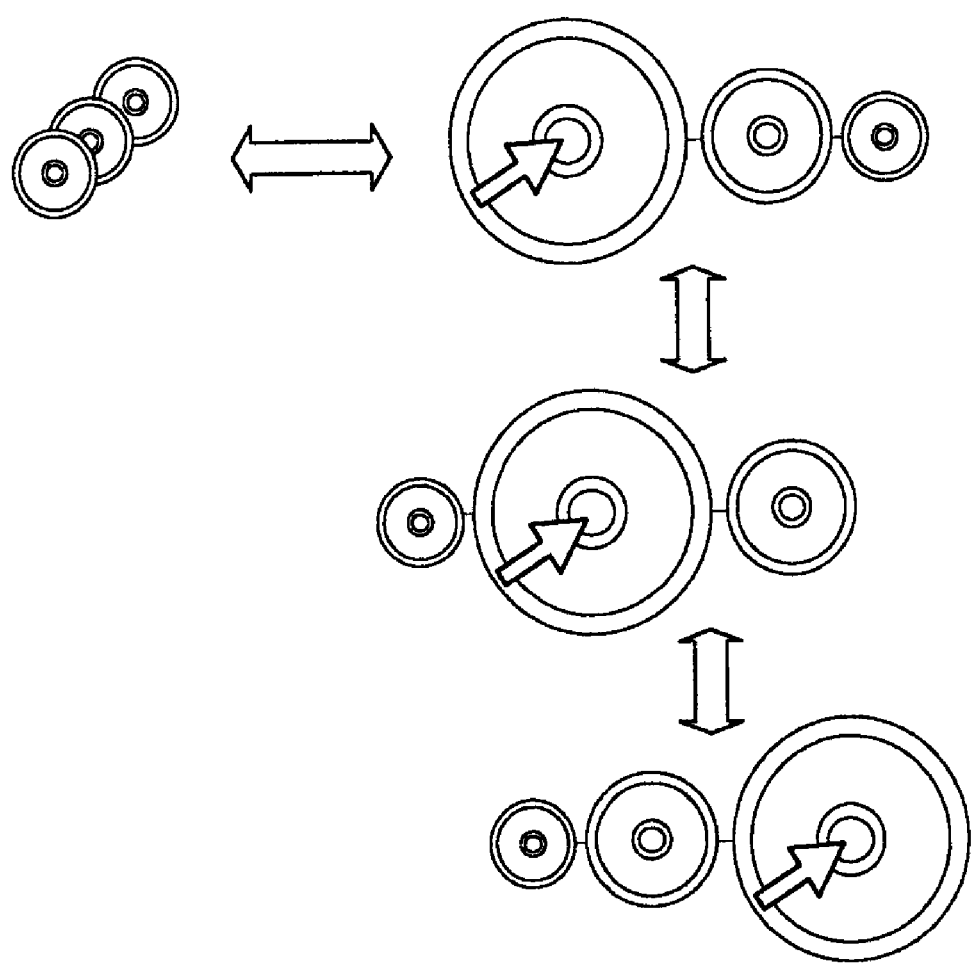
FIG. 11 illustrates how content marks which have been gathered by searching are sorted and representations of the content marks are changed by clicking them with the pointer.

As shown in FIG. 10, the search result displaying means 19 has a function of defining a search result display region D on the display screen 21 and a function of graphically displaying one or more of the content marks corresponding to one or more searched contents in the search result display region D as the search result R. With the functions of the search result displaying means 19 as described above, the current searching operation and the search result R of the previous search may be confirmed on the same display screen 21. In addition, the search result R may readily be displayed on the display screen merely by moving the pointer, thereby considerably increasing the operability of the content search and display. As shown in FIG. 11, the sequence and representation of the search content marks may be changed by clicking the search content marks. In this embodiment, the search result including one or more content marks may be enlarged in the search result display region D. As a rule, one or more searched content marks are initially arranged in a row in the order that the content marks have been searched. The row of the content marks is a so-called playlist. For example, as shown in FIG. 11, a content mark which may be the focus of the playlist is enlarged for display, and other content marks are displayed in different sizes depending upon the similarity with and proximity to the focus content mark.

Figure 12:
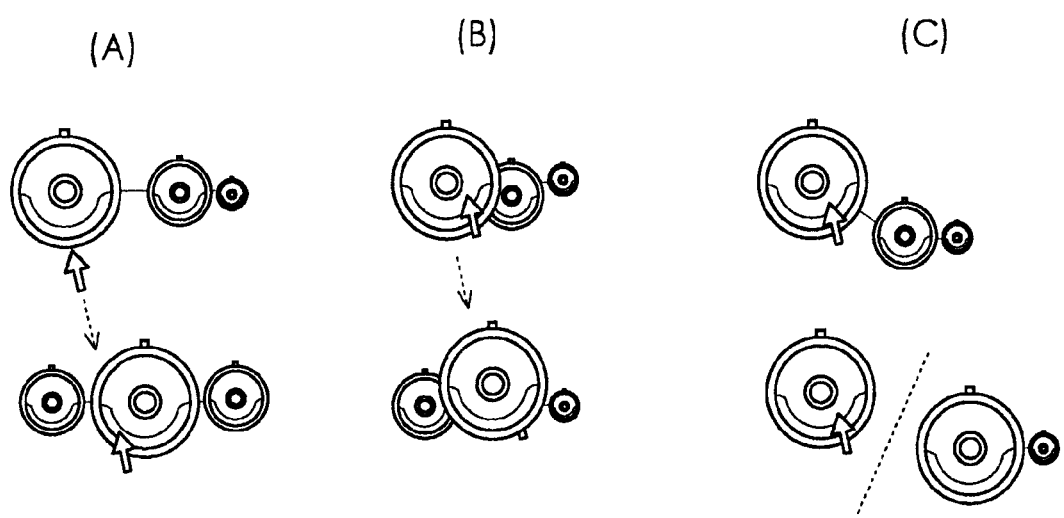
FIGS. 12A, 12B, and 12C illustrate an editing situation.
Figure 13:
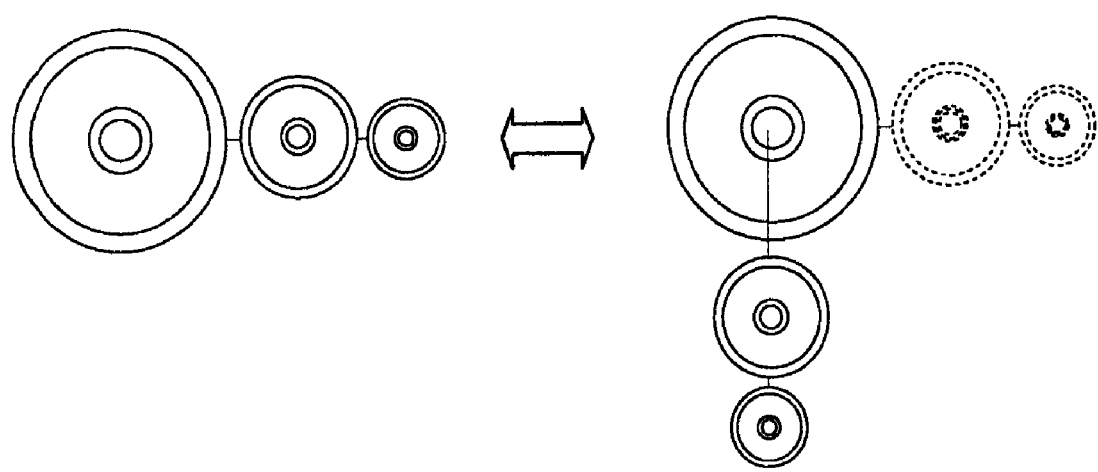
FIG. 13 illustrates how content marks are sorted.

As shown in FIGS. 12A to 12C, another content mark may be added to the row of content marks in the playlist (see FIG. 12A), the content marks in the playlist may be sorted (see FIG. 12B), and a content mark may be deleted from the playlist (see FIG. 12C). Editing of the content marks is done by the search result editing means 33. As shown in FIG. 13, the search result displayed in a row may be changed into a column by the search result editing means 33. When the playlist is displayed in a column, content marks may be arranged in a descending order of the similarity with the focus content mark which is placed at the top. The search result editing means 33 may further have a function of determining a degree of similarity between one content corresponding to one content mark selected from the content marks included in the search result and other contents corresponding to content marks other than the one content mark selected; making duplications of the content marks which are arranged in such a manner that the one content mark is placed at the top and is followed by the other content marks arranged in a descending order of the degree of similarity; and displaying the duplications distinguishably from the search result. The duplications refer to so-called copies. When a duplication is displayed, one content mark selected may not be duplicated and may be used as it is, and duplications of other content marks may be arranged for display in a different direction from the direction in which the original searched content marks are arranged. For example, the original searched content marks are arranged in a row, and the duplications are arranged in a column.

As shown in FIG. 10, the search result editing means 33 of the search result displaying means 19 may further have a function of selectively implementing graphical display of one or more content marks in the search result display region D as the search result R, or graphical display of a representative content mark RCM representing one or more content marks. With this function of the search result editing means 33 of the search result displaying means 19, a number of search results may be displayed in a limited space by using the representative content mark RCM when the search results are not immediately used. As needed, one or more content marks may be displayed based on the representative content mark RCM representing the one or more content marks.

In this embodiment, music contents are searched. The search result displaying means 19 may further include music playback and displaying means 24 for playing back the music contents. The search result displaying means 19 may be configured to cause the music playback and displaying means 24 to play back the music content corresponding to the content mark selected once one content mark is clicked with the pointer P for selection from one or more content marks displayed in the search result display region D. With this configuration, the search result of the music contents displayed on the display screen 21 may be reproduced merely by clicking the content marks, thereby significantly simplifying the playback operation of the music.

Figure 14:
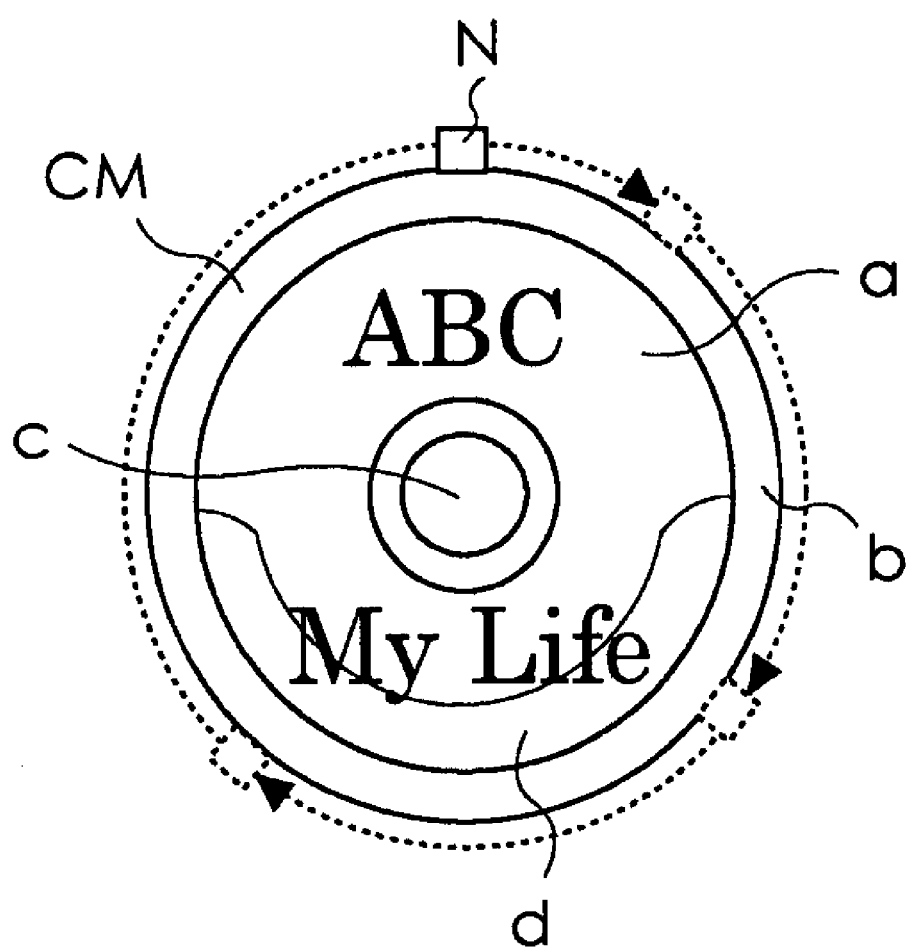
FIG. 14 illustrates components of the content mark.

The content mark displaying means 32 may have a function of changing a representation of the content mark so that a playback state and/or playback position may be visually confirmed while the music playback and displaying means 24 is playing back the music content corresponding to the content mark. As shown in FIG. 14, the content mark CM includes a playback position change command handle N for generating a command to forcibly change a playback position of a music content when the handle N is operated with the pointer P during playback of the music content. The playback position change command handle N moves around the content mark CM as the playback proceeds. When the handle N has moved around the content mark CM one time, the playback of one musical piece is completed. Thus, the length of the musical piece corresponds to the speed at which the handle N goes around the content mark CM. If the position of the playback position change command handle N is changed during playback as indicated with a dotted line, the playback position of the music content which is being played back is accordingly changed. As a result, trial listening of unknown music contents may be summarized in a short time. Furthermore, the time required for editing may be reduced.

Figure 15:
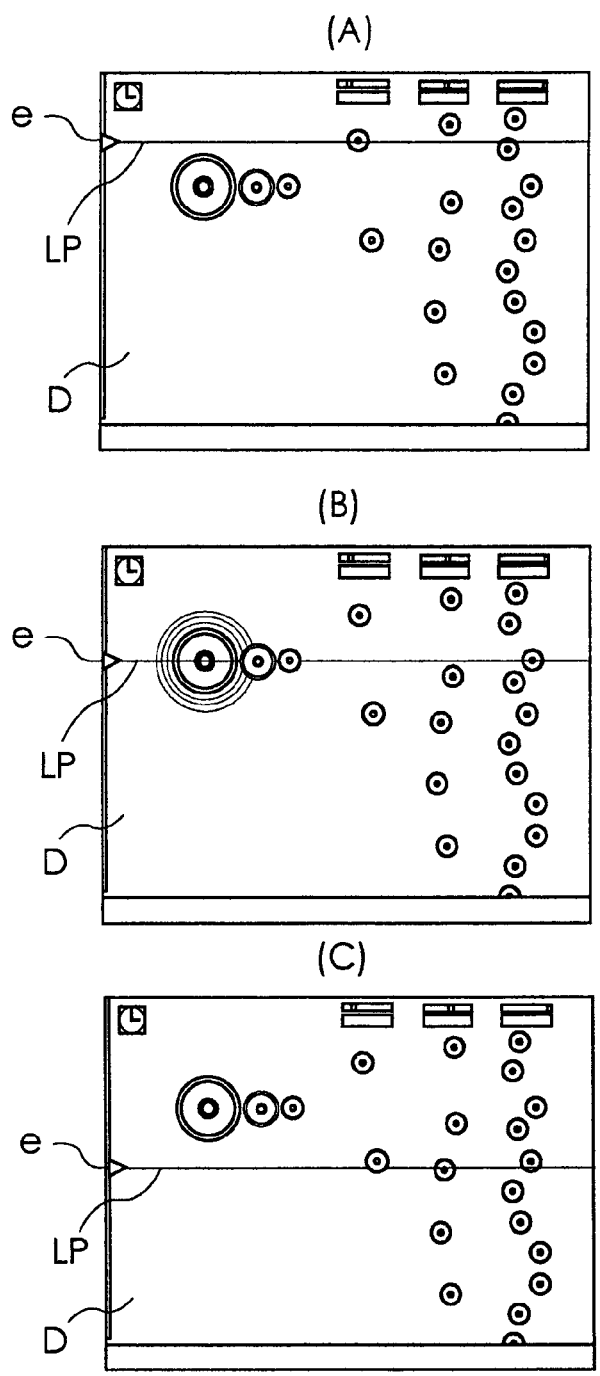
FIG. 15 illustrates a playback situation of a search result using a playback pointer.
Figure 16:
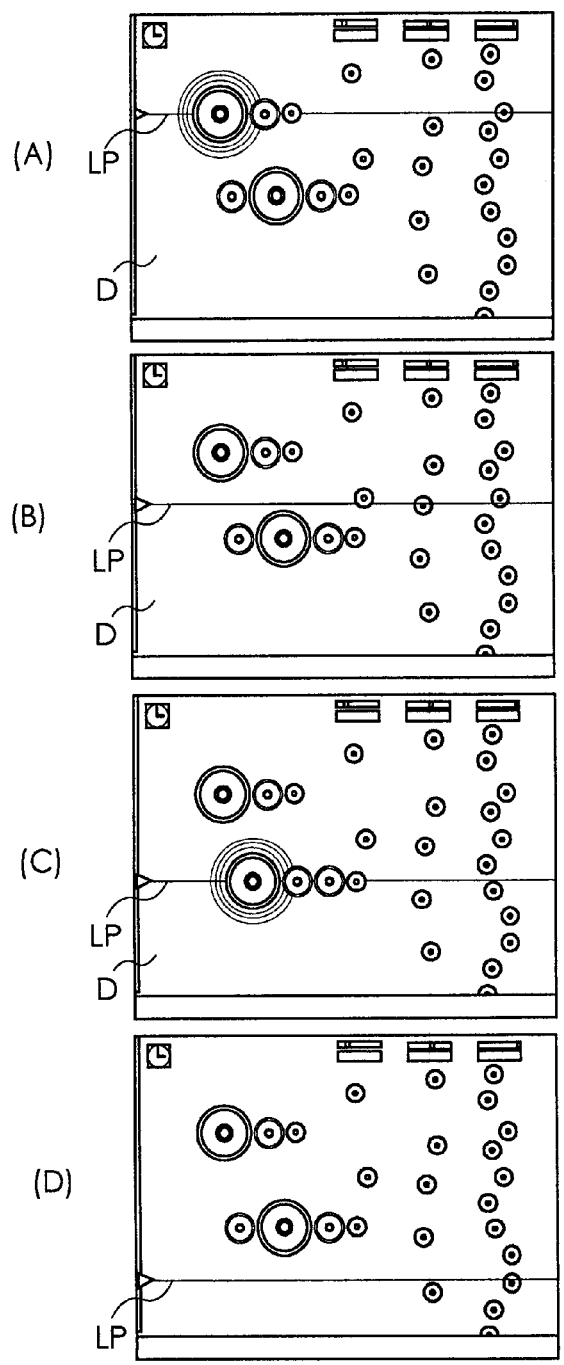
FIGS. 16A, 16B, 16C, and 16D illustrate how respective content marks are reproduced or played back as the playback pointer is moved downward when a plurality of search results are displayed in a search result display region.

As shown in FIG. 15, the search result displaying means 19 further have a function of displaying and moving a linear playback pointer LP in the search result display region D, and a function of causing the music playback and displaying means 24 to sequentially play back the music contents corresponding to the content marks as the playback pointer LP goes over the content marks in a given state as a result of moving the playback pointer LP when the content marks are lined up in the search result display region. The music contents are sequentially played back as follows: a music content corresponding to a content mark located at the utmost left in the row is first played back, and a music content corresponding to a content mark located at the utmost right in the row is last played back. In this embodiment, as shown in FIG. 15B, a content mark corresponding to the content being played back is enlarged for display, and ripples are additionally displayed around the content mark during the playback.

The above-mentioned functions are implemented by the screen driving means 23. In this embodiment, a music playback start command is outputted from the screen driving means 23 to the music playback and displaying means 24. Upon receipt of the music playback start command, the music the music playback and displaying means 24 reads from the content storing means 13 a content corresponding to a content mark, and starts playback of the music. With the playback function of the search result displaying means 19, the search result may be disposed in the search result display region D as a collection of content marks, and the search result may sequentially be played back by intentionally or unintentionally moving the linear playback pointer LP in the search result region. In this embodiment, the search result displaying means 19 has a function of restraining playback of the music contents corresponding to one or more content marks represented by one representative content mark RCM although the playback pointer LP goes over the representative content mark RCM as a result that the screen driving means 23 of the search result displaying means 19 has moved the playback pointer LP. FIGS. 16A to 16D illustrate how respective content marks are reproduced or played back as the playback pointer LP is moved downward when a plurality of search results are displayed in a search result display region D.

The content search and display system of this embodiment, in which music contents are searched, may satisfy the user's desires such as "I want to hear something," and "I want to listen to the music in my way." Now, the respective functions or steps described so far will be described in a viewpoint of commercialization of the present invention. The major ideas for the technologies implemented in this embodiment are referred to as "music-disc streaming function," "similarity-based sticking function," and "meta-playlist function."

First of all, the "music-disc streaming function" will be described. This function is designed to sequentially display images of discs, which respectively correspond to musical pieces in the user's music collection, on the display screen as if the discs are flowing one after another from top to bottom on the screen. A "music collection" refers to any set of musical pieces that the user can listen to. For example, it refers to a group of musical pieces recorded in a portable audio player or personal computer, or a group of musical pieces provided by a flat-rate unlimited music subscription service. A "disc" corresponds to a content mark CM. As if the user casually picks up a CD from a stack of CDs, he or she may select a disc and listen to the musical piece recorded therein. This function allows the user to encounter a variety of musical pieces. It is useful when the user does not want to listen to a specific musical piece.

The "music-disc streaming function" may realize novel and flexible "encounters with musical pieces" which could not be expected through broadcasting, recommendations, and hierarchical structures. As illustrated in FIG. 4, content marks corresponding to musical pieces are outputted one after another from three rectangular outlets or music-supply taps located at the top, and then flow straight down at a constant speed. Since the outlets are wide, the content marks are laterally spread and fall down. The respective outlets are designed to output content marks of different moods. The content mark disappears when it reaches the bottom of the screen, or "Ground." The user may drag a particular content mark in which he or she gets interested among content marks flowing down with a mouse operation (or pen/stylus, or touch-panel/tablet operation), and listen to a musical piece associated with the content mark. Rolling the mouse pointer over a content mark expands the mark, and displays the artist's name and title of the music on the mark, as shown in FIG. 14. When the artist's snapshots used in the CD sleeves are available, they may be displayed.

Each of the outlets and content marks may be colored to reflect the mood of the musical piece. Also, the outlet may be represented with a similar color to the content marks outputted therefrom. With this arrangement, color similarity is associated with musical similarity. When the user trial listens to a music content corresponding to a certain content mark and likes it, he or she may select other music pieces with reference to the color of the content marks.

Next, the "similarity-based sticking function" will be described. This function is designed to allow the user to pick up content marks corresponding to contents of a similar mood. With this function, the user may selectively make a desired content mark stick to a previously selected content mark by causing the content mark dragged out of the stream of content marks to touch other streaming content marks. This operation may be a kind of searching similar musical pieces. This function is significantly different from conventional searching which simply lists up similar musical pieces. With this function, the user may pick up similar musical pieces from the stream of music contents according to the user's choice. In other words, this function allows the user to "encounter musical pieces" with an operation like casually picking up a CD that he or she likes.

The "ease of sticking," with which one content mark sticks to another, may be defined according to the similarity in mood between music contents corresponding to the respective content marks. A content mark sticks to another content mark upon the first contact if the similarity is high between two contents corresponding to the content marks. If the similarity is low between two contents corresponding to the content marks, the content marks may stick to each other after they have been brought in contact several times. In any way, two content marks will finally stick to each other. In this way, it is possible to adjust the similarity range of musical pieces that are additionally selected by appropriately maneuvering the content mark, which has been dragged with the pointer, among the streaming content marks.

Sticking content marks one after another with the "similarity-based sticking function," forms a series of overlapping content marks as shown in the left figure of FIG. 11. This is called "compact mode." Double-clicking the content mark at the top rearranges the discs into a row where the discs are not overlapping, as shown in the right figure of FIG. 11. This is called "maintenance mode." In the maintenance mode, a content mark overlapped with the pointer P is focused and expanded. The neighboring content marks are also expanded slightly.

When the maintenance mode is entered, components shown in FIG. 14 are displayed on the respective content marks, thereby enabling the following functions.

[Playback Control]

Double-clicking a playback area a of a content mark CM starts the playback of a music content corresponding to that content mark CM. During playback, animated ripples are continuously displayed around the content mark CM. When the music content is played to the end, a music content corresponding to the next content mark CM is automatically played. Double-clicking during playback stops the playback.

[Playback Position Slider]

A playback position slider is embedded in the circumference or outer periphery of the content mark CM, having a similar function to that of an ordinary audio player. A clockwise full round starting at the twelve o'clock position corresponds to the length of one musical piece. Clicking at an arbitrary position starts the playback from that position.

[Minimize]

Double-clicking a minimize area c in the center of the content mark CM switches to the compact mode.

[Sort]

Double-clicking a sort area d at the bottom of the content mark CM switches to "sort mode" which is illustrated in the right side of FIG. 13. Duplications of content marks other than the top content mark are sequentially produced, following the top content mark, and rearranged into a column in a descending order of the mood similarity. The duplicated content marks disappear when exiting the sort mode.

In this embodiment, a series of overlapping content marks is a highly-functional playlist indicating the playback order. When the user wants to zap the music using an existing audio player, namely, to listen to the music by changing from one musical piece to another, he or she takes a two-step procedure. One of the titles in the playlist is double-clicked for selection, and then a desired position is clicked on the playback position slider located apart from the playlist. In contrast therewith, the sort mode of this embodiment enables automatic playback of musical pieces one after another with a simple operation of moving the pointer or focus during playback. A start operation for next playback is not needed. Clicking a playback position slider b (see FIG. 14) embedded in the circumference or outer periphery of the content mark right after moving the focus, may select a musical piece substantially at the same time with specification of the playback position in the musical piece with simple successive operations. Thus, smoother zapping is enabled than ever before.

The "similarity-based sticking function" allows the user to make playlists one after another by freely dragging content marks on the screen, and to place the playlists in the search result region D of the display screen. Then, the user may consider not only the order of musical pieces to listen to in the respective playlists but also the playback order of the playlists. The "meta-playlist function" will aid in this connection.

Here, the "meta-playlist function" will be described. This function allows the user to specify the playback order of the playlists by rearranging the playlists (a series of content marks) which have been appropriately arranged on the screen, as if the user sorts a group of CDs on the desk. The entire screen is regarded as a meta-playlist, and the playlists on the screen are played back in the order from top to bottom. A playback pointer for the entire screen is provided for this function, which is represented in a straight horizontal line or a playback bar as shown in FIG. 15.

The playback pointer LP placed on the bottom of the screen may freely be lifted up by dragging with the mouse a handle e located on the left. Then, as the playback bar falls down from the position where the bar has been lifted up, and gets in contact with the respective playlists (a series of content marks), a corresponding series of musical pieces are played back. A playlist in the compact mode, that is one represented by a representative content mark is not played back.

It is only the positional relationship in the screen's longitudinal direction among the playback lists that has influence to the playback order. The positional relationship in the screen's lateral direction does not affect the playback order unless the playback lists are located on the same level. It is important for the meta-playlist function that the user may flexibly arrange the playlists. For example, the user may arrange some playlists on a trial-and-error basis to determine the playback order: first, the user randomly locates the playlists in the screen's lateral direction; second, the user changes the positional relationship among the playlists in the screen's longitudinal direction by slightly shifting the respective playlists up and down; then the user trial listens to musical pieces of the respective playlists as the playback pointer moves down. Or, the user may arrange the playlists according to his or her own rule, for example, lively music on the left and peaceful music on the right. Further, the user may set playlists which he or she does not want to listen to at the present moment in the compact mode and leave them on the screen. The user does not have to remove these playlists from the screen since the playlists in the compact mode do not interfere with the playback operation.

Thus, the meta-playlist function allows the user to freely exchange groups of musical pieces, called playlists, and to create a meta-playlist, thereby enabling more flexible editing of the playlists than ever. If the user wants to do the same operation, namely, to exchange the groups of musical pieces (playlists) on an existing audio player, the user has to repeat the operation of selecting and inserting into the player a plurality of musical pieces.

In this embodiment, the user may arrange on the screen the respective groups of playlists as an individual playlist. If the playback order is changed, it is not necessary to change the positional relationship among the playlists in the screen's lateral direction. Thus, the user may utilize memorized positional relationships among the playlists and intuitively create a meta-playlist on a trial-and-error basis.

This kind of editing the playlist can be said to be a creative way of enjoying the music, in which the user is actively involved, rather than a simple operation of sorting the playlists. The importance of the playlist can be known from the facts that artists focus on the order of musical pieces in their albums and there are many active websites where people compare the playlists of their own making with each other.

Once it becomes common that the user encounters new musical pieces or meets again the musical pieces that he or she heard in the past using the "music-disc streaming" and "similarity-based sticking" functions, and the user creates his or her own playlist on a trial-and-error basis using the "meta-playlist" function, listening to the music using a content search and display system of the present invention will become a daily scene, and "a musical piece played back on this system" will substantially be equivalent to the user's experience of listening to the music. It will be convenient if the user can readily know it by checking the playlists in the past when he or she wants to know what kind of music he or she used to listen to. In this embodiment, this is referred to as the "time-machine" function.

Specifically, the content search and display system further comprises past data recording means 35 for storing all of data usable for reproducing a past operating situation shown on the display screen, and past data reproducing means 37 for reproducing the past operating situation in an active state on the display screen, based on the data stored in the past data recording means 35. To do this, a past data recording step is executed and a function of recording past data is performed. A command from the past data reproducing means 37 is inputted into the screen driving means 23 and the music playback and displaying means 24. With these means, the search results in the past are accessible at all the times. When the user is busy, or he or she wants to play back the search result in the past, the past search result can be played back.

Figure 17:
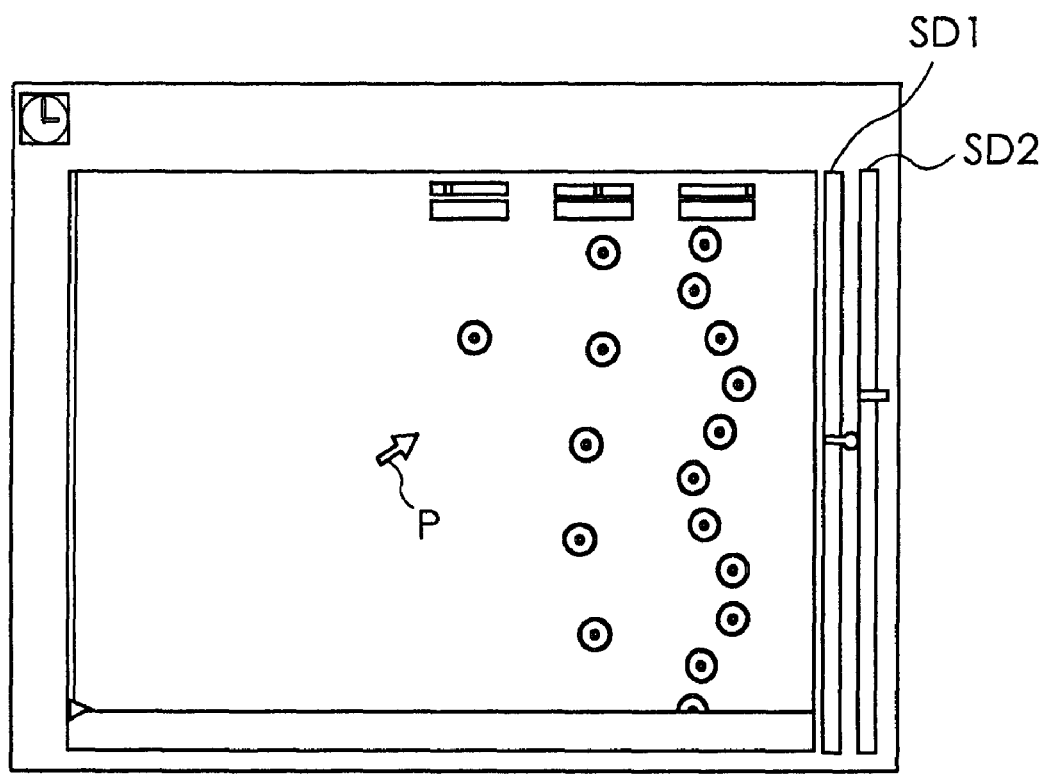
FIG. 17 is a screen display of a system equipped with a time-machine function.
Figure 18:
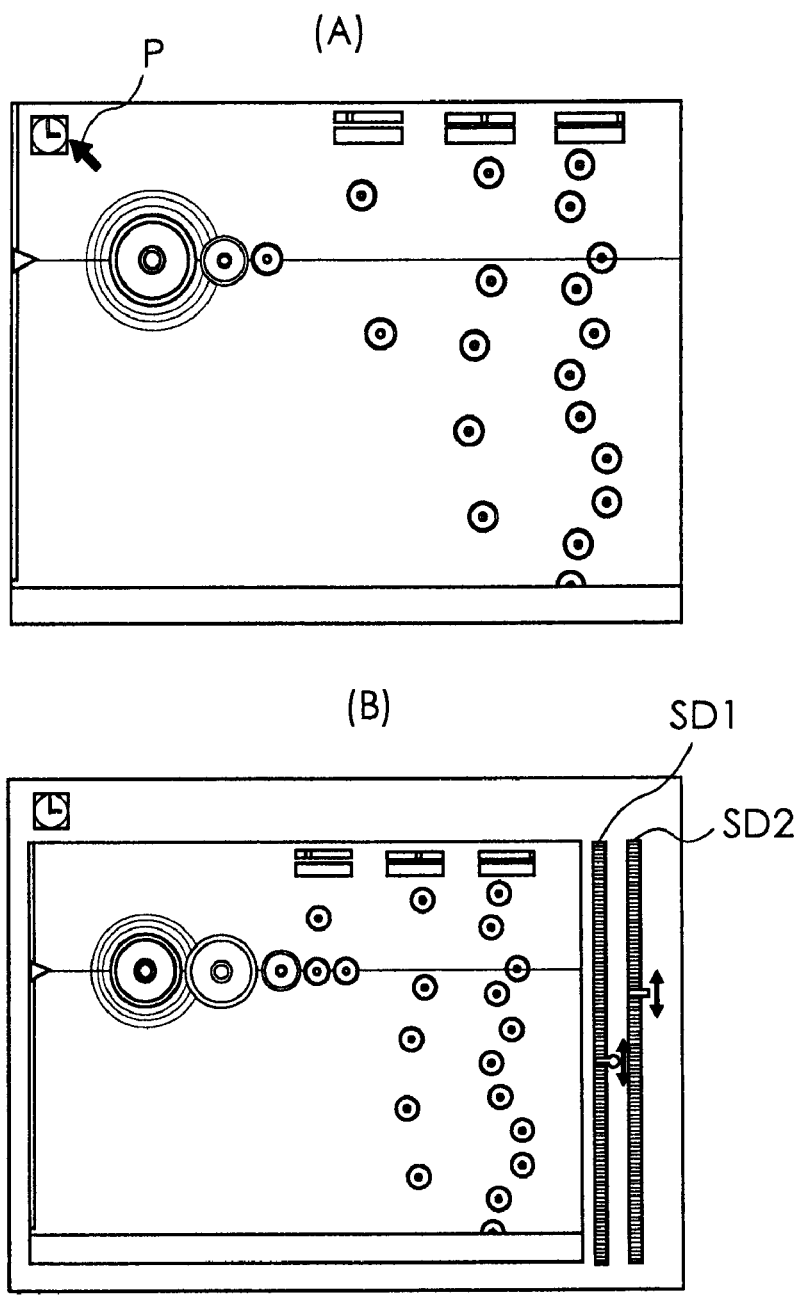
FIGS. 18A and 18B illustrate how a slider is displayed to execute the time-machine function.

The past data reproducing means 37 includes a rewind slider SD1 for specifying a past point of time in a relative manner, and/or a date/time slider for specifying a past date and time. Both of the sliders are displayed on the display screen 21 and operated with the pointer as shown in FIG. 17. In actuality, both of the sliders SD1 and SD2 are displayed to be operable on the display screen 21. As shown in FIG. 18A, clicking with the pointer a clock symbol displayed on the upper left portion of the screen switches the screen to the one as shown in FIG. 18B. In the screen of FIG. 18B, clicking the clock symbol switches back the screen to the one shown in FIG. 18A.

Figure 19:
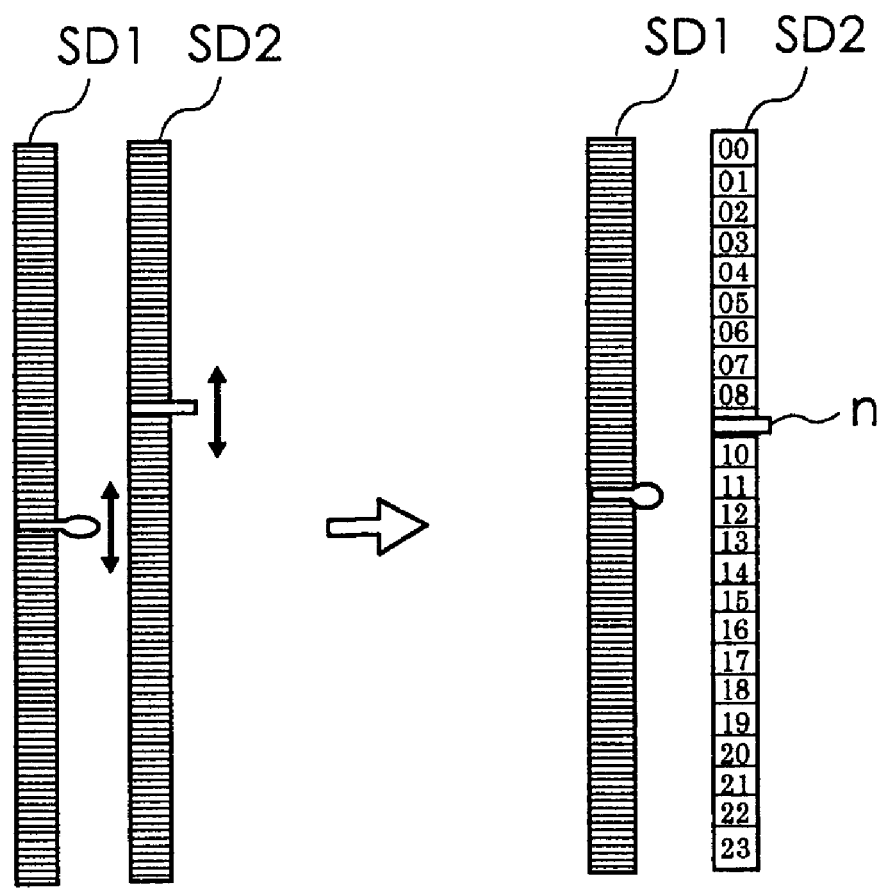
FIG. 19 is an enlarged illustration of sliders SD1 and SD2.

The "time-machine" function records all operations performed by the user and all screen changes, and allows the user to go back to a desired point of time in the past while browsing the recorded history of the operations and screen changes. The user may go back to a particular point of time in the past as if he or she felt like riding on a time machine, reproduce the screen of that point of time or restore the situation in which he or she listened to the music, and continue with the operation from that point of time. Part of the playlists placed on the screen may be copied and pasted to the current screen. FIG. 19 is an enlarged view of the sliders SD1 and SD2. A figure on the right side illustrates how to specify a time and date with the slider SD2. The slider SD2 specifies the year, month, and day in this order. The year, month, and day are specified by moving a slide knob N and clicking the slide knob with the pointer.

The rewind slider SD1 is a slider which allows the user to go back to the past in units of seconds relative to the present. The user may browse the operating history as if he or she rewinds the recorded screen images. The date/time slider SD2 is a slider which allows the user to move back to a particular point of time in the past by specifying the particular point of time as the year, month, and day, as well as time and minute. When a segment of the slider is colored for a period of time during which the system was being activated, the user can easily find a desired time in the past and go back there.

The time-machine function makes it easier to select a musical piece to now listen to and determine the playback order on a trial-and-error basis. If the user dragged a musical piece using the music-disc streaming function and listened to it, but he or she discarded it because he or she thought there might be a better musical piece to listen to, or the musical piece reached the ground and disappeared, or if the user discarded a musical piece which was tentatively sticking to the pointer using the similarity-based sticking function because he or she could not get interested in that music at that time, the user may restore that musical piece using the time-machine function, and therefore will not regret having done so.

The content search and display system of this embodiment may further comprise similar music selecting and playback means 39 for selecting a music content similar to the music content played back among the contents when playback of the music content is completed, as shown in FIG. 2. With the similar music selecting and playback means 39, the user may encounter an unknown content of his or her taste without performing any particular operation. Especially, when the similar music selecting and playback means 39 has a function of selecting a music content similar to the music content played back among the contents corresponding to the content marks displayed in the mark display regions A to C when playback of the music content is completed, the user may come across unknown music contents of a limited genre, for example, jazz or classic by limiting the sorts of content marks to be displayed in the mark display regions A to C.

When the playback is completed, the similar music selecting and playback means 39 selects a next musical piece to play back based on the similarity of the music as follows:

1. A feature vector is extracted from each musical piece in advance.
2. Similarity is calculated using the feature vectors between the current musical piece which has just been played back and a next musical piece to be played back when the playback is completed.
3. A musical piece which falls within a range of similarity specified by the user is played back next.
4. When a plurality of musical pieces fall within the specified range of similarity, one musical piece is randomly selected from among them.
5. When no musical pieces fall within the specified range of similarity, a musical piece which is the most similar to the musical piece which has just been played back is played back next.

The range of similarity may be specified as follows:
The feature vector is mapped into a two-dimension using principal component analysis. Any two-dimensional mapping such as self-organized mapping may be employed.
The planar coordinates thus obtained are converted into polar coordinates to calculate an angle θ. This is the basis for determining the similarity.
The range of similarity is arbitrarily determined as an angle a. A musical piece having an angle θ, which falls within the range of an angle θ+ or − an angle a, is played back.
The range of similarity may also be specified as follows.
The similarity is calculated between the feature vector of a musical piece which is being played and a collection of musical pieces which can be played back.
The result is normalized so that a musical piece having the least similarity may be 1 (one).
An arbitrary range is defined between 0 and 1.
Any musical piece falling within this range may be played back.

When music contents are to be searched, the search and display system of the present invention may satisfy the user's desire to sequentially listen to musical pieces of a mood similar to one CD which has been casually picked up by the user from a stack of CDs, played and liked by the user. The content search and display system of the present invention may also satisfy the user's desire to consider the playback order of music pieces with a high degree of freedom equivalent to the one which allows the user to stack up CDs and sort the stacking order of the CDs on his or her own desk when he or she wants to listen to the music. In addition, the content search and display system of the present invention may also satisfy the user's desire to reproduce the playlist which was used at a particular point of time in the past, for example, on a memorial or memorable date.

Now, the following sections will describe preprocessing of each musical piece in a music collection and implementation of the interface functions in a test system according to the present invention. First, in the preprocessing, a feature vector is extracted from each of the musical pieces for calculating the similarity, and is associated with a color (hue and saturation) of its corresponding content mark. A music-catalog file is generated in an XML format, including titles, names of artists, MP3 sound file names, feature vectors, and content mark colors.

In this embodiment, a 30-dimensional vector is used as a feature vector obtained by analyzing the mood of each musical piece. The 30-dimensional vector consists of the mean and variance of local spectral features (centroid, rolloff, flux, and zero-crossings) across the entire musical piece (in total, eight dimensions), average values of mel-frequency cepstral coefficients (MFCC across the entire musical piece (in total, ten dimensions), a portion of the musical piece occupied by low-energy intervals (one dimension), pitch content features reflecting periodicity in high pitch (in total, five dimensions), and rhythmic content features reflecting periodicity in beat (in total, six dimensions). This has been extracted using a music genre analysis tool or software called MARSYAS as described in "MARSYAS: A Framework for Audio Analysis, Organised Sound" (Vol. 4, No. 30, 2000) written by G. Tzanetakis and P. Cook.

The content mark color (hue and saturation) is determined from coordinates obtained by projecting each musical piece onto a plane defined by the first principal component p1 and the second principal component p2 which are derived from principal component analysis of the feature vector. Specifically, the planar coordinates are converted into polar coordinates, an angle θ is allocated to the hue and a distance r from the origin is allocated to the saturation.

As an interface, Macromedia's Flash MX Professional 2004 is implemented. The interface reads in the music-catalog file which has been generated in the preprocessing.

First, the "music-disc streaming" function divides the hue angle θ equally into three, namely, in units of 120 degrees, and allocates them to three outlets (music supply taps). Each of the taps outputs content marks having the same hue value as that of the tap. The outputting interval of content marks can be adjusted in a range of 3 to 10 seconds with an adjustment slider so that a content mark does not overlap another content mark when streaming content marks are expanded.

Next, the "similarity-based sticking" function determines "ease of sticking" between two content marks based on the hue angle θ of each content mark. When an absolute value of the difference of the hue angles is in a range of 0 to 30 degrees, two content marks will stick to each other upon the first occurrence, the absolute value of the difference is in a range of 30 to 80 degrees and a range of 80 to 130 degrees, two content marks will stick to each other on the second and third occurrence, respectively. When the absolute value of the difference is more than that, two marks will stick to each other upon the fourth occurrence. In the "sort mode" of the playlist, content marks in a series must be sorted in a descending order of similarity. The similarity is defined in terms of the cosine angle (scalar product) between the 30-dimensional feature vectors of the content marks in a series.

Last, the "time-machine" function continuously records snapshot information (all the content marks on the screen and internal situations of the music supply taps, dates and times) enough to reproduce the past situations, every second while in a running state.

A content search and display system according to the present invention was tested using the RWC music database ("the RWC Music Database: Database for Development and Research including musical and instrumental pieces approved by JASRAC" Journal of ISPJ, Vol. 45, No. 3, pp 728-738, 2004) Proc. of ICA 2004, written by Goto, et al.). Through the experiments carried out, it has been confirmed that the proposed interface worked effectively and that four functions working in combination provided the user with new unique music listening environment that has never been experienced so far.

In the content search and display system of this embodiment where music contents are to be searched, an operation of picking up a musical piece among streaming content marks and sticking it to the pointer has been introduced and has accordingly increased opportunities for the user to come across unknown musical pieces that has never been experienced.

First, the present invention may provide more opportunities for the user to actively encounter musical pieces by increasing the number of musical pieces to be displayed on the screen. In general, in order to make it possible to read in the bibliographic information on all of musical pieces, it is necessary to limit the number of the musical pieces and display the information in an appropriate size. In this embodiment of the present invention, the bibliographic information on all the musical pieces is not displayed, but only compact information, namely, content marks are displayed, indicating "there are musical pieces." Thus, the number of musical pieces, which the user can select at a time, is increased. On the other hand, when a large amount of information is presented at a time, it is a problem how to make selections from among them. In this embodiment, the problem has been solved by providing the "similarity-based sticking" function and coloring of the content marks. The zapping function and the "time-machine" function also help the user make selections.

Second, since the number of musical pieces to be presented to the user is not limited in advance on the computer side, although limiting the number of musical pieces is common to "query-by-example" searches, opportunities for the user to encounter unexpected musical pieces have increased. When the number of information items is limited as with the bibliographic information, it is necessary to make prior selections. When the number of the items to be presented is not limited, prior selections are not required.

The invention claimed is:

1. A content search and display system comprising:
content storing means in which many contents are stored;
search condition specifying means to be operated by a user for specifying a search condition;
content searching means for searching one or more contents, which meet at least part of the search condition, among the many music contents, based on the search condition specified by the user; and
search result displaying means for displaying a result of a search carried out by the content searching means on a display screen,
the content searching means including:

operating situation detecting means for detecting an operating situation of the search condition specifying means during searching;

condition adding/modifying means for adding or modifying the search condition in the course of searching in accordance with the operating situation detected by the operating situation detecting means;

search result accumulating means for cumulatively storing a search result based on the search condition specified by the user or the search condition added or modified by the condition adding/modifying means, and content mark displaying means for defining a plurality of mark display regions on the display screen, and sequentially displaying a plurality of content marks, which respectively correspond to the many music contents stored in the content storing means, in each of the plurality of mark display regions in such a manner that the content marks are spaced to each other and moving from one side to the other side in a certain direction in each of the mark display regions, wherein the search condition specifying means is configured to operate a pointer according to the user's operation, the pointer making the content searching means operable to search when the pointer is displayed on the display screen and is enabled;

the operating situation detecting means is configured to detect the operating situation, based on a co-relation between the pointer moving on the display screen and the content marks displayed in the mark display regions; and the condition adding/modifying means is configured to add or modify the search condition so as to search the contents that correspond to the content marks displayed in the mark display region and are overlapped with the pointer, when the pointer is placed in one of the mark display regions and is enabled.

2. The content search and display system of claim 1, wherein the search condition specifying means is configured to determine the search condition specified by the user as searching other contents associated with one of the contents that corresponds to one content mark overlapped with the pointer when the pointer is placed on the one content mark of the content marks displayed in one of the mark display regions and is enabled by the user; and the search result displaying means has a function of displaying the content marks on the display screen in such a manner that the one content mark sticks to the pointer when specification of the search condition is completed; while the pointer with the one content mark sticking thereto is moving over the content marks displayed in the mark display regions as the search condition specifying means is operated, a co-relation between the content and other contents corresponding to the other content marks overlapped with the pointer or the one content mark is checked based on the search condition; when a content which meets at least part of the search condition is searched, the content mark corresponding to this content sticks to the one content mark sticking to the pointer; and when a content is subsequently searched one after another, a content mark corresponding to the subsequently searched content sticks to the content mark moving together with the pointer.

3. The content search and display system of claim 1, wherein the search result displaying means has a function of defining a search result display region on the display screen and a function of graphically displaying one or more of the content marks corresponding to one or more searched contents in the search result display region as the search result.

4. The content search and display system of claim 3, wherein the search result displaying means further has a function of selectively implementing graphical display of the one or more content marks in the search result display region as the search result, or graphical display of one representative content mark representing the one or more content marks.

5. The content search and display system of claim 3, wherein the search result displaying means further has a function of selectively displaying an enlarged image of the one or more content marks displayed in the search result display region.

6. The content search and display system of claim 3, further comprising search result editing means for editing the search result by deleting one or more content marks from the search result displayed in the search result display region, sorting a plurality of content marks included in the search result, or adding one or more other content marks to the search result.

7. The content search and display system of claim 6, wherein the search result editing means has a function of determining a degree of similarity between one content corresponding to one content mark selected from the content marks included in the search result and other contents corresponding to content marks other than the one content mark selected, making duplications of the content marks which are arranged in such a manner that the one content mark is placed at the top and is followed by the other content marks arranged in a descending order of the degree of similarity, and displaying the duplications distinguishably from the search result.

8. The content search and display system of claim 1, wherein the search result displaying means further includes music playback and displaying means for playing back the music contents; and the search result displaying means is configured to cause the music playback and displaying means to play back the music content corresponding to the content mark selected once the one content mark is clicked with the pointer for selection from the one or more content marks displayed in the search result display region.

9. The content search and display system of claim 8, wherein the content mark displaying means has a function of changing a representation of the content mark so that a playback state or a playback position may visually be confirmed while the music playback and displaying means is playing back the music content corresponding to the content mark.

10. The content search and display system of claim 8, wherein the content mark includes a playback position change command handle for generating a command to forcibly change a playback position of a music content when the handle is operated with the pointer during playback of the music content.

11. The content search and display system of claim 8, wherein the search result displaying means further has a function of displaying and moving a linear playback pointer in the search result display region, and a function of causing the music playback and displaying means to sequentially play back the music contents corresponding to the content marks as the playback pointer goes over the content marks in a given state as a result of moving the playback pointer when the content marks are lined up in the search result display region.

12. The content search and display system of claim 8, wherein the search result displaying means further has:

a function of selectively implementing graphical display of the one or more content marks in the search result display region as the search result, or graphical display of one representative content mark representing the one or more content marks;

a function of displaying and moving a linear playback pointer in the search result display region;

a function of causing the music playback and displaying means to sequentially play back the music contents corresponding to the content marks as the playback pointer goes over the content marks in a given state as a result of moving the playback pointer; and a function of restraining playback of the music contents corresponding to the one or more content marks represented by the one representative content mark although the playback pointer goes over the one representative content mark as a result of moving the playback pointer.

13. The content search and display system of claim 8, further comprising similar music selecting and playback means for selecting a music content similar to the music content played back among the contents when playback of the music content is completed.

14. The content search and display system of claim 8, further comprising similar music selecting and playback means for selecting a music content similar to the music content played back among the contents corresponding to the content marks displayed in the mark display region when playback of the music content is completed.

15. The content search and display system of claim 13, wherein the similar music selecting and playback means calculates a degree of similarity with reference to a feature vector of the music content, and selects a similar music content based on the calculated degree of similarity.

16. The content search and display system of claim 1, further comprising:

past data recording means for storing all of data usable for reproducing a past operating situation shown on the display screen; and past data reproducing means for reproducing the past operating situation in an active state on the display screen, based on the data stored in the past data recording means.

17. The content search and display system of claim 16, wherein the past data reproducing means includes a slider for specifying a past point of time in a relative manner or a slider for specifying a past date and time, both of the sliders being displayed on the display screen and operated with the pointer.

18. A content search and display method comprising:

a content storing means providing step of building up content storing means in which many contents are stored;

a search condition specifying step of specifying a search condition using search condition specifying means to be operated by a user;

a content searching step of searching one or more contents, which meet at least part of the search condition, among the many music contents, based on the search condition specified by the user; and a search result displaying step of displaying a result of a search carried out in the content searching step on a display screen, the content searching step including an operating situation detecting step of detecting an operating situation of the search condition specifying means during searching; a condition adding/modifying step of adding or modifying the search condition in the course of searching in accordance with the operating situation detected in the operating situation detecting step; and a search result accumulating step of cumulatively storing a search result based on the search condition specified by the user or the search condition added or modified in the condition adding/modifying step; and a content mark displaying step of defining a plurality of mark display regions on the display screen, and sequentially displaying a plurality of content marks, which respectively correspond to the many music contents stored in the content storing means, in each of the plurality of mark display regions in such a manner that the content marks are spaced to each other and moving from one side to the other side in a certain direction in each of the mark display regions; wherein the search condition specifying step operates a pointer according to the user's operation, the pointer causing the content searching step to search when the pointer is displayed on the display screen and is enabled; and the operating situation detecting step detects the operating situation, based on a co-relation between the pointer moving on the display screen and the content marks displayed in the mark display regions; and the condition adding/modifying step adds or modifies the search condition so as to search the contents that correspond to the content marks displayed in the mark display region and are overlapped with the pointer, when the pointer is placed in one of the mark display regions and is enabled.

19. The content search and display method of claim 18, wherein the search result displaying step defines a search result display region on the display screen and graphically displays one or more of the content marks corresponding to one or more searched contents in the search result display region as the search result, and the method further comprises:

a search result editing step of editing the search result by deleting one or more content marks from the search result displayed in the search result display region, sorting a plurality of content marks included in the search result, or adding one or more other content marks to the search result.

* * * * *